US012683367B2

(12) United States Patent (10) Patent No.: US 12,683,367 B2

Farolfi (45) Date of Patent: Jul. 14, 2026

(54) APPARATUS AND PROCESS FOR REMOVING AN END PORTION OF THE SHIELDING FOIL OF A SHIELDED ELECTRIC CABLE

(71) Applicant: SOCIETA' PER AZIONI CURTI-COSTRUZIONI MECCANICHE, Castel Bolognese (IT)

(72) Inventor: Nicola Farolfi, Castel Bolognese (IT)

(73) Assignee: SOCIETA' PER AZIONI CURTI-COSTRUZIONI MECCANICHE, Castel Bolognese (IT)

( * ) Notice: Subject to any disclaimer, the term of this patent is extended or adjusted under 35 U.S.C. 154(b) by 111 days.

(21) Appl. No.: 18/468,899

(22) Filed: Sep. 18, 2023

(65) Prior Publication Data

US 2024/0222945 A1 Jul. 4, 2024

(30) Foreign Application Priority Data

Sep. 19, 2022 (IT) ......................... 102022000019206

(51) Int. Cl.
H02G 1/12 (2006.01)

(52) U.S. Cl.
CPC ................................ H02G 1/1202 (2013.01)

(58) Field of Classification Search
CPC ...... H02G 1/1202; H02G 1/1256; H02G 1/12; H02G 1/27; H02G 1/1265; H02G 1/1297;
(Continued)

(56) References Cited

U.S. PATENT DOCUMENTS 5,058,260 A * 10/1991 Gloe ...................... H01R 43/05
72/418
5,269,206 A * 12/1993 Yagawa ............... H02G 1/1256
81/9.51
(Continued)

FOREIGN PATENT DOCUMENTS

CN 206148789 U 5/2017
DE 284168 5/1915
(Continued)

OTHER PUBLICATIONS

Search Report and written opinion issued by the EPO on May 2, 2023 for Italian priority application No. IT 2022000019206.
(Continued)

*Primary Examiner* — Ghassem Alie

(57) ABSTRACT

An apparatus (10) for removing an end portion (3a) of the shielding foil (3) of a shielded electric cable (1) is described, wherein an end portion (1a) of said cable (1) has at least one shielding foil (3) which covers at least one conductor (2, 20) equipped with a covering layer (5, 50), wherein at least one end portion (3a) of said shielding foil (3) is exposed. The apparatus (10) comprises positioning means (14, 15) for positioning said shielding foil (3) of said at least one conductor (2, 20) in at least one tensioning position, moving means (9a) adapted to operate a relative tensioning motion between said positioning means (14, 15) and said cable (1) to cause the tensioning of said end portion (3a) of the shielding foil (3), cutting means (8a, 8b) provided with a cutting surface (81a, 81b); and moving means (19) configured to move said cutting means (8a, 8b) with respect to said foil to a tensioning position, preferably at least along a radial direction with respect to the longitudinal axis (X) of said cable (1), to carry out the cutting of the foil.

30 Claims, 12 Drawing Sheets

(58) Field of Classification Search
CPC .... H01R 43/28; H01R 43/0488; H01R 43/05;
H01R 43/052; B26D 3/00
USPC ......................................................... 83/880
See application file for complete search history.

(56) References Cited

U.S. PATENT DOCUMENTS

| | | |
|---|---|---|
| 2018/0175595 A1 | 6/2018 | Ben-Ron et al. |
| 2021/0194226 A1 | 6/2021 | Ben-Ron et al. |
| 2022/0077666 A1 | 3/2022 | Sorg |
| 2022/0239078 A1 | 7/2022 | Sorg |

FOREIGN PATENT DOCUMENTS

| | | |
|---|---|---|
| DE | 102010018342 | 1/2012 |
| EP | 4016768 | 6/2022 |
| WO | 2021060300 A1 | 4/2021 |

OTHER PUBLICATIONS

European Search Report and written opinion issued by the EPO on Jan. 30, 2024 for corresponding EP application No. 23197984.0.
International search report and written opinion issued by the EPO for PCT/IB2024/060277 on Feb. 10, 2025.

* cited by examiner

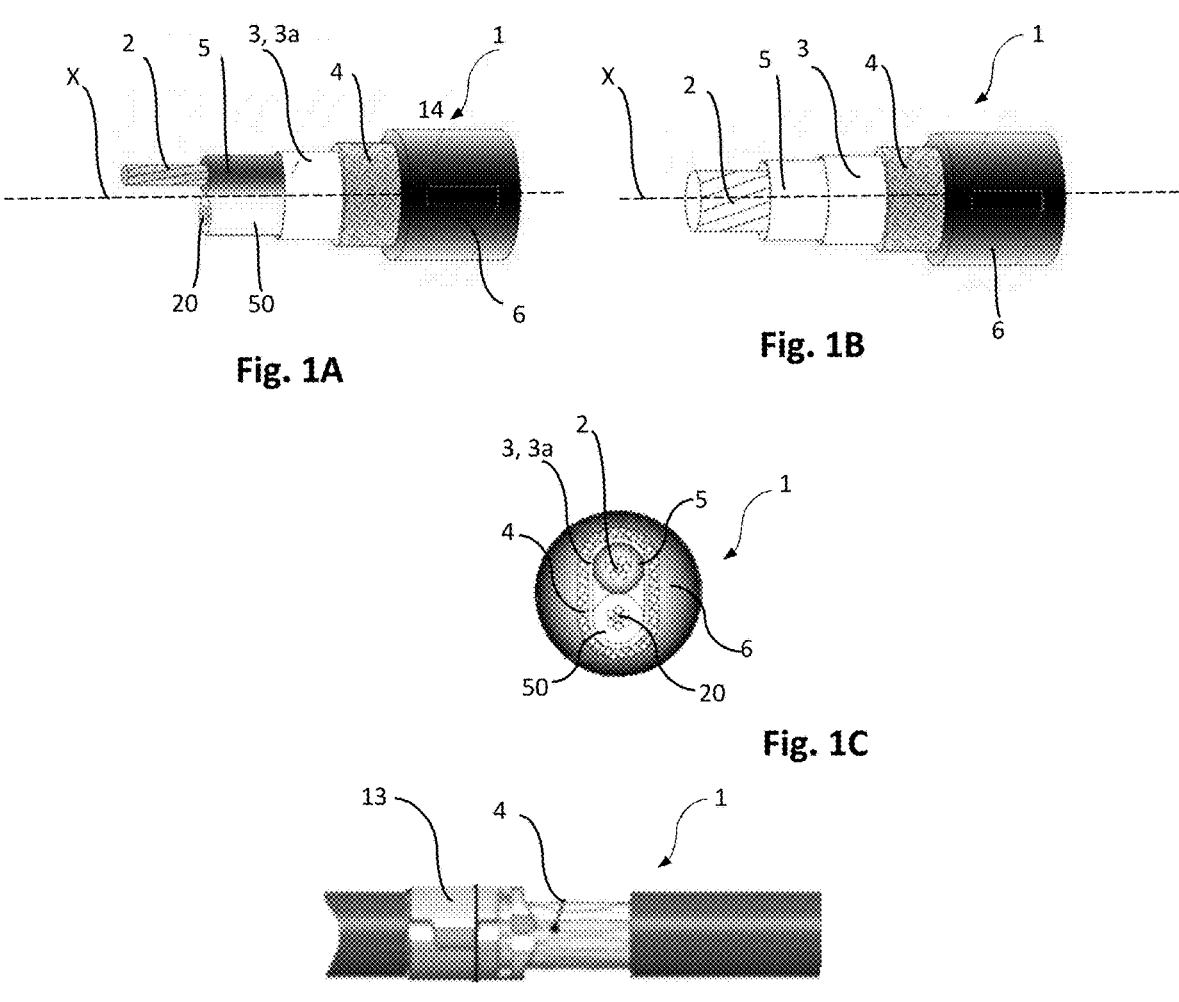
Fig. 1A
Fig. 1B
Fig. 1C
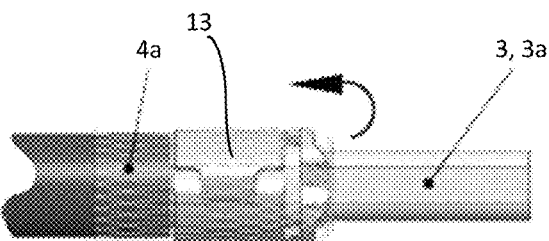
Fig. 2A
Fig. 2B

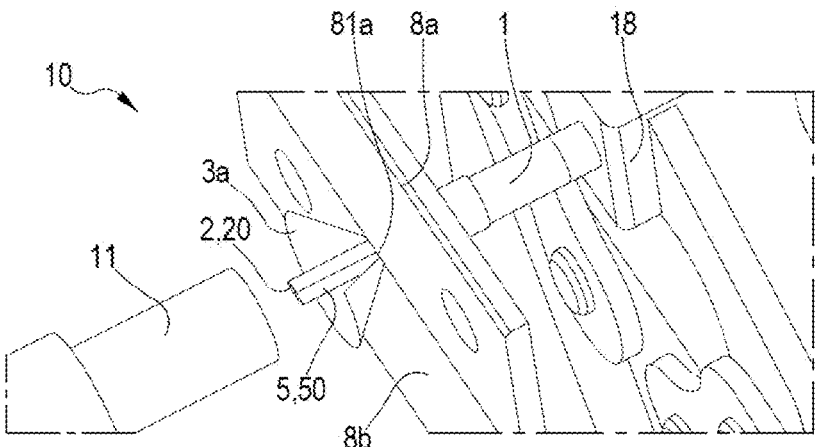
Figura 7A
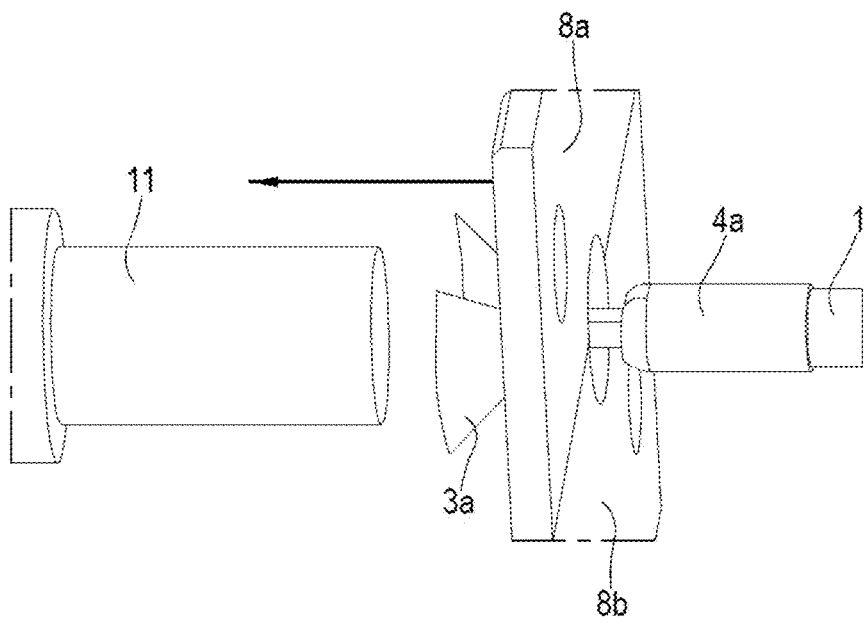
Figura 7B

APPARATUS AND PROCESS FOR REMOVING AN END PORTION OF THE SHIELDING FOIL OF A SHIELDED ELECTRIC CABLE

CROSS-REFERENCE TO RELATED APPLICATION

This application claims priority to and the benefit of Italian Application 102022000019206 filed 19 Sep. 2022, the contents of which are hereby incorporated by reference herein, as if set forth in their entirety.

FIELD OF THE INVENTION

The present invention relates to an apparatus and process for removing an end portion of the shielding foil of a shielded electric cable. The present invention is used in the field of shielded electric cables and particularly in the field of bipolar cables.

KNOWN PRIOR ART

Shielded electric cables comprising one or more conductors dielectrically insulated and provided with one or more shielding layers made of electrically conducting material, which act as an electromagnetic shield to cancel or at least limit electromagnetic interference (EMI), are known.

Cables (e.g. coaxial cables) having a single central conductor usually made of copper, wrapped in a layer of electrically insulating material (a dielectric) usually made of polyethylene or PTFE, which separates the central core from one or more outer shielding layers, are known.

Generally, the shielding layer comprises a shielding foil of conductive material (known in the art by the English term "foil"), e.g., a thin, preferably multilayer, aluminum-based film that wraps around the layer of electrically insulating material, and a shielding braid that wraps around this underlying foil. There is also an outer cable-insulation sheath that encloses the layers and components described above.

Also bipolar cables, which have two adjacent conductors, each individually wrapped in a respective layer of electrically insulating material (a dielectric), and one or more shielding layers which generally comprise a shielding foil covering the assembly of the two conductors, which are individually wrapped in the layer of electrically insulating material, are known.

Such bipolar cables also have a shielding braid composed of strands, which surrounds this shielding foil made of conductive material.

As known, the shielding metal foil can be made, for example, of a preferably multi-layered aluminum-based foil having different thicknesses, usually between 0.05 mm and 0.3 mm, though not limited thereto, which is arranged around the dielectric that covers the conductor (or in general one or more conductors) of the shielded electric cable.

In other words, the foil, constituting an additional shielding of the cable, is generally interposed between the electrically insulating material (dielectric) and the braid.

As mentioned above, there is a protective sheath usually made of an electrically insulating material on the outside of the shielding braid.

The shielded electric cables may be further provided with electric connectors connected to the ends of the electric cable. For example, in order to constrain a connector to the end portion of a coaxial or bipolar cable, the end portion of the electric cable must be prepared by carrying out a process which typically comprises the following steps:

removing a portion of the outer protective sheath, so as to leave a predetermined length of the shielding braid exposed at an end portion of the electric cable;

removing or overturn backwards (i.e., in the opposite direction with respect to the free end or end portion of the cable which is under operation) a portion of the exposed shielding braid, in order to shorten the exposed portion of shielding braid so as to obtain the final part of the cable end portion with the shielding foil exposed;

removing a portion of the shielding foil, to shorten the exposed portion of shielding foil so as to obtain the final part of the cable end portion with the dielectric exposed.

Removing the shielding foil is a crucial operation in the process of preparing the end portion of a shielded electric cable.

Some processes pertaining to the known art, such as the one described for example in JP2019208322, carry out the removal of the shielding foil by applying an air jet to the outer surface of the end portion of the cable.

The shielded cable is inserted into a cone-shaped support cavity and the end portion comprising the shielding foil to be removed is inserted into a stripping cavity adjacent to, and coaxial with the cone-shaped cavity in which the cable is retained.

The apparatus comprises a channel (parallel to the stripping cavity) to supply air into the stripping cavity through ducts that branch off transversely from the air supply channel to deliver air into the stripping cavity towards the end portion of the cable. In a second embodiment, air can be injected in the central duct of the stripping cavity.

In addition, the apparatus has cutting blades arranged between the insertion portion and the stripping portion to sever the shielding foil.

In this regard, the process according to JP2019208322 provides for rotating the cable and the apparatus relative to each other about the axis of the cable so as to determine the cutting of the foil and separation from the cable.

The foil removal obtained by means of this process may be nonuniform, that is, the cutting profile of the foil is nonuniform in the circumferential direction because it depends on the displacement of the foil towards the blades, which can be highly variable from one operation to the next and therefore not very precisely repeatable.

In addition, a disadvantage arising from such an apparatus is the fact that waste portions of the foil, e.g., scraps, may remain in the apparatus, for example in the stripping cavity or in the air ducts.

In addition, the operations are complicated by the need to insert the cable into the support and stripping cavities, in fact, they require the cable to be inserted into the closed section of these elements. This operation may cause an undesirable contact resulting in deformation of parts of the cable, such as the shielding foil with the inner walls of the cavity in which it is inserted, thereby jeopardizing the subsequent removal operations.

Furthermore, the shape of the support and stripping cavities is unsuitable for use with non-circular shaped cables, such as cables of the bipolar type, which do not have a perfectly circular section.

Object of the present invention is to overcome the drawbacks of the art and to provide a process and an apparatus for preparing the end portion of a shielded electric cable capable of carrying out the removal of the end portion of the shielding foil with high degree of precision, thereby achieving a clean and homogeneous cutting profile.

Further object of the present invention is to provide a process and apparatus for preparing the end portion of a shielded electric cable capable of carrying out the removal of the shielding foil uniformly and without the risk of damaging the foil and/or conductor(s) of the shielded electric cable.

Further object of the present invention is to provide a process and apparatus for preparing the end portion of a shielded electric cable which is capable of carrying out the removal of the shielding foil and which is simple and inexpensive to make.

Further object of the invention is to provide a process and apparatus for removing the shielding foil of a shielded electric cable that is versatile and can be used in combination with different types of shielded cable, particularly with multipolar-type cables.

SUMMARY OF THE INVENTION

These and other objects are achieved by the present invention by means of an apparatus for removing the end portion of the shielding foil of a shielded electric cable according to the independent claim 1 and a process according to the independent claim 16.

Additional features/aspects of the present invention are described below and/or set forth in the dependent claims. From the very beginning, it should be noted that what described and/or claimed herein referring to the process may be applied to the apparatus and vice versa.

The apparatus for removing an end portion of the shielding foil of a shielded electric cable, wherein an end portion of the cable has at least one shielding foil covering at least one conductor provided with a layer covering the shielded electric cable (in other words, the shielding foil is placed outside the insulating covering layer the at least one conductor is equipped with), and wherein at least one end portion of the shielding foil is exposed, comprises:

positioning means for positioning the shielding foil in at least one tensioning position, axially moving means adapted to operate a relative tensioning motion in the axial direction with respect to said cable, between the positioning means and the cable to cause the tensioning of the end portion of the shielding foil and thus to cause said tensioning position to be reached, cutting means provided with a cutting surface, the apparatus further comprising radially moving means configured to move said cutting means, preferably at least along a radial direction with respect to the longitudinal axis of the cable, with respect to the foil placed in a tensioning position to carry out the cutting of the foil.

It should be noted that the expressions "tensioning position" and "tensioning of the end portion of the shielding foil" mean the condition, or state, in which the end portion of the shielding foil is tensioned. In other words, these expressions are intended to mean the tensioned condition, or state, of the foil and, in particular, the condition, or state, caused in the end portion of the foil by the application of a tensile force.

Advantageously, the apparatus according to the invention allows the shielding foil to be removed uniformly and without the risk of damaging the foil and/or the conductor(s) of the shielded electric cable.

In fact, the movement of the positioning means allows the foil to be tensioned and, in particular, to reach a tensioning position in which the foil is in a tensioned state. The term "tensioning movement" will also be used in this description to refer to the relative motion between the positioning means and the cable that results in the tensioning of the end portion of the shielding foil, preferably by the application of a tensile force.

Such a tensioning position, in which the foil is under tension, is particularly suitable for carrying out the cutting operations.

According to an aspect, the apparatus comprises radially moving means configured to move the positioning means along a radial direction with respect to the longitudinal axis X of the cable, between a closed position to engage the outer surface of the shielding foil of the cable and an open position in which the cable is released from the positioning means.

According to an aspect, the end portion of the shielding foil is retained by the positioning means at least during the tensioning movement.

Specifically, according to an aspect, the positioning means are shaped to retain the cable at least during the tensioning movement and during cutting.

It should also be noted that, according to an aspect of the present invention, in the case where foil removal is carried out by the positioning means, the shielding foil is retained by the positioning means even during the further movement of foil removal.

According to an aspect of the present invention, the positioning means are displaced by the moving means by a travel that is selected so as to bring the foil into a tensioning state.

According to an aspect, this tensioning travel is between 0.2 mm and 3 mm. In other words, the desired tensioning of the shielding foil can be determined by means of a travel, or displacement, for example between 0.2 mm and 3 mm, preferably measured in the axial direction (i.e., according to a direction X' parallel to or coincident with the axis X of the cable) also appropriately selected according to the thickness of the foil and its own elastic characteristics.

Advantageously, according to the present invention, the effective cutting of the shielding foil and its subsequent removal is achieved simply and economically by tensioning the foil by a limited tensioning travel or displacement operated by the foil positioning means, thus requiring inexpensive and uncomplicated components.

In fact, a limited travel or displacement appropriately selected in relation to the nature of the shielding foil from its physical and morphological state, e.g., a travel according to the claimed range, is sufficient to obtain effective tensioning of the foil, which, as mentioned above, allows a subsequent clean cut to be achieved.

Compared with the apparatuses of the known art and in particular those using only an air jet for removing the foil, the apparatus according to the present invention is much more effective and precise.

According to an aspect of the present invention, the positioning means are movable to make an additional travel greater than the tensioning travel, to cause the removal of the end portion of the shielding foil.

Therefore, advantageously, in the case where the foil removal is carried out by the positioning means, the shielding foil is retained by the positioning means that are displaced by the axially moving means by an additional travel greater than the tensioning travel, to cause the removal of the end portion of the shielding foil from the cable.

It should be noted that the axially moving means cause a relative motion, in the axial direction with respect to the cable, between the positioning means and the cable to cause the tensioning of the end portion of the shielding foil.

Advantageously, the relative movement of the positioning means with respect to the cable allows the foil to be subjected to a tensile force, preferably in the axial direction, which results in the effective tensioning thereof.

It should be noted that axial motion means a movement along a direction that is parallel or coincident to the longitudinal axis of the cable. However, movements of the positioning means according to directions inclined with respect to the cable axis, which still allow a tensile action to be transmitted on the shielding foil, thus determining the tensioning thereof, are not excluded.

According to an aspect, the contacting surface of the positioning means with the end part of the shielding foil of the positioning means is configured to provide the anchorage and/or an increase in the coefficient of friction as well as an increase in the localized pressure, and preferably the contacting surface comprises a surface discontinuity and/or a material with a high coefficient of friction.

For example, the surface discontinuity is obtained by machining that creates surface discontinuities and/or by interposing a material that increases the coefficient of friction.

Advantageously, the positioning means are shaped so as to retain the cable to be processed at least during the tensioning movement and during cutting and, in the case where foil removal is carried out by the positioning means, the foil is retained by the positioning means also during the further relative movement with respect to the cable to cause the foil to be separated from the end of the cable and here the removal thereof.

According to an aspect, the shape of such elements, which will be better described below, provides a locking/retaining surface to lock/retain the cable that is substantially complementary to the shape of the latter so as to retain it with extreme precision, without excessively compressing the conductor wrapped inside the foil.

According to an aspect, in the closed position (and thus the one in which the foil is retained), the surface contacting the end portion of the shielding foil of the positioning means delimits an opening substantially complementary to the section of the end portion of the cable comprising the end portion of the shielding foil which covers the at least one conductor.

According to one aspect, the cutting surface of the cutting means has a profile which is substantially complementary to the profile of the outer surface of the shielding foil covering both the at least one conductor and the covering layer with which it is equipped and/or to be substantially complementary to the profile of the outer surface of the covering layer of the at least one conductor.

Advantageously, according to this aspect, the shape of the cutting surface, preferably complementary to the profile of the outer surface of the foil and/or complementary to the profile of the outer surface of the covering layer of the at least one conductor, allows the foil under tension to be torn and/or cut by the positioning means with a homogeneous cutting profile, without damaging the underlying conductor.

It should be noted that the term "substantially complementary" is used herein to mean that the profile of the cutting surface follows (at least in part, preferably along its full extent and then completely) the profile of the outer surface of the foil and/or the outer surface of the covering layer of the at least one conductor.

According to an aspect, the profile of the cutting surface has a shape similar (in the sense of geometric similarity) to the profile of the outer surface of the foil and/or the profile of the outer surface of the covering layer of the at least one conductor.

According to an aspect, in the closed position, the cutting surface of the cutting means has a profile (or perimeter) that is substantially complementary to the profile (or perimeter) of the end portion of the cable, comprising the end portion of such shielding foil covering said at least one conductor.

In particular, according to this aspect, in the closed position, the cutting surface of the cutting means has a profile (or perimeter) substantially complementary to the profile (or perimeter) of the outer surface of the shielding foil and/or the profile (perimeter) of the outer surface of the covering layer of the at least one conductor.

In other words, according to an aspect, in the closed position, the cutting surface of the cutting means forms a closed perimeter or profile that delimits an opening within which the cable is placed. The section delimited by the profile of the cutting surface of the cutting means substantially corresponds (preferably has a similar shape) to the section of the end portion of the cable (according to a plane perpendicular to the cable axis) comprising the end portion of this exposed shielding foil covering said at least one conductor.

In more detail, according to an aspect, the section delimited by the profile of the cutting surface of the cutting means substantially corresponds (preferably has a similar shape) to the section of the end portion of the cable (according to a plane perpendicular to the cable axis) delimited externally by the outer surface of the exposed shielding foil or delimited externally by the outer surface of the covering layer of the at least one conductor.

According to an aspect, the cutting surface of the cutting means comprises at least one curved surface.

Advantageously, the presence of an at least partially curved shape of the cutting surface allows the tearing and/or cutting of the foil, which is effectively subjected to tension due to the fact that the cutting profile is configured similarly to the shape of the outer surface of the shielding foil, which has an at least partially curved surface due to its arrangement on the at least one conductor of the cable.

Advantageously, according to such a configuration, the apparatus is adapted to process cables of the coaxial type and such a curved cutting surface is shaped to be complementary to the profile of the outer surface of the shielding foil, so as to optimally surround the latter in the closed position.

According to an aspect, the cutting surface of the cutting means comprises at least one protruding element, or tooth.

According to an aspect, the cable comprises two preferably adjacent conductors and the cutting surface of the cutting means is configured to be substantially complementary to the profile of the outer surface of the shielding foil covering said preferably adjacent conductors, which are each equipped with a covering layer, and/or to be substantially complementary to the profile of the outer surface of the covering layer of the two conductors.

Preferably, according to an aspect, the cutting surface of the cutting means has a profile substantially formed by the intersection of two circumferences intersecting each other.

Advantageously, according to such a configuration, the apparatus is adapted to process cables preferably of the bipolar type, and such a cutting surface that has a profile formed by the intersection of two intersecting circumferences is formed to be complementary to the profile of the outer surface of the shielding foil wrapping the two adjacent conductors and/or to be complementary to the outer surface of the covering layer of the two adjacent conductors, so as to optimally enclose (surround) the foil in the closed position.

However, the application with cables having a larger number of conductors is not excluded. In these possible embodiments, the cutting surface is appropriately shaped to be complementary to the profile of the outer surface of the shielding foil wrapping the cable conductors and/or to be complementary to the outer surface of the covering layer of the conductors, so as to optimally enclose (surround) the foil in the closed position.

According to an aspect, the cutting means are moved by the moving means, preferably in a radial direction with respect to the cable, between a closed position to engage the outer surface of the shielding foil and an open position in which the cable is released from the cutting means.

Specifically, the cutting means are moved by the moving means, preferably in the radial direction with respect to the cable, between a closed position in which the cutting surface surrounds the outer surface of the shielding foil that covers the at least one conductor equipped with a covering layer, and an open position in which the cable is released from the cutting means.

It should be noted that the term surrounds is used herein to mean that, according to possible embodiments, it is not excluded that at least part of the profile of the cutting surface may possibly be placed at a distance from the surface of the foil.

According to an aspect, the apparatus comprises axially moving means adapted to operate a relative motion between the cutting means and the cable, in an axial direction with respect to the cable, in order to cause the end portion of the shielding foil to be removed.

It should be noted that axial motion means a movement along a direction that is parallel or coincident to the longitudinal axis of the cable.

Advantageously, the apparatus allows the shielding foil to be removed uniformly and without the risk of damaging the foil and/or the conductor(s) of the shielded electric cable.

According to this aspect, the end portion of the shielding foil is removed by the relative motion between the cutting means and said cable, operated by the axially moving means in the axial direction with respect to the cable, and/or by the relative motion between the positioning means and the cable, operated by the axially moving means in the axial direction with respect to the cable.

Advantageously, it therefore happens that the end portion of the shielding foil is removed by the cutting means and/or the positioning means, thus by a separate (or simultaneous and synergical) action of the cutting means and the positioning means.

Advantageously, in the apparatus according to the present invention, thanks to the action of tensioning the shielding foil (which is preferably made in the form of a multilayer thin film) operated by the positioning means, it is possible to make effective the subsequent cutting operation operated by the cutting means which, acting on the shielding foil in a tensioned condition, results in a clean cut of the latter.

The subsequent relative movement between the cutting means and the cable, and/or between the positioning means and the cable, allows the previously cut foil to be removed and thus to be separated from the cable in a certain, simple and effective way even on cables equipped with more than one conductor.

The removal of the shielding foil is defined as the separation of the foil portion of the cable end, and, as mentioned above, such removal can be advantageously accomplished quickly and easily by the movement of the cutting means or by a further movement of the positioning means (previously moved for tensioning the foil), or by a combination thereof.

According to an aspect, the radially moving means are configured to move these positioning means with respect to the cable, preferably at least along a radial direction with respect to the longitudinal axis X of the cable.

According to an aspect, in case the foil removal is carried out by the cutting means, during the relative motion preferably in the axial direction between the cutting means and the cable, the end portion of the foil is retained by the cutting means.

It should be noted that the expression "end portion of the foil is retained by the cutting means" is intended to mean that, during the preferably axial movement, the cutting means allow the portion of the shielding foil to be dragged and thus removed (separated) from the cable.

According to an aspect, the apparatus comprises at least one pressurised air source adapted to deliver pressurised air to said end portion, such that the pressurised air exerts a force on said end portion of said at least one shielding foil to push it towards said cutting surface of said cutting means.

Advantageously, by means of the present apparatus, the axial movement of the cutting means allows the foil to be completely removed. In fact, in case the tearing operation of the foil, which can be operated by the cutting means due to the action of the air flow acting on the foil, is not sufficient to carry out the complete detachment of the foil, the axial translation of the cutting means with respect to the cable allows the removal of the non-torn end portion of the foil, which is opened by the pressurised air flow and preferably retained by the cutting means.

Advantageously, in the apparatus according to the present invention, the action of the pressurised air flow delivered on the shielding foil and the relative movement in the axial direction between the cutting means and the cable allows the foil to be removed and thus separated from the cable in a certain, simple and effective manner even on cables equipped with more than one conductor.

As will be discussed more fully below, according to an aspect of the invention, the action of pressurised air pushing the foil against the cutting means (to determine its opening and to hold it against the cutting means) is combined with the relative axial movement between the cutting means and the cable.

It should be noted that the term "combined" is intended to mean that the action of the air flow and the relative axial motion can be performed in succession (and thus performed at two separate times but cooperating with each other by being performed in succession), or they can be performed simultaneously with the air flow acting on the foil for at least part of the axial movement, preferably the entire duration thereof.

In addition, the axial movement of the cutting means in the axial direction overcomes the drawbacks of the apparatus according to JP2019208322 in which the operation of removing the shielding foil is carried out by delivering pressurised air into the cavity in which the cable is inserted, which causes the foil to be displaced towards the blades with the consequent problems of uncertainty of the accuracy of the cut performed and repeatability of the operation.

In addition, unlike the process according to JP2019208322, which provides for rotating the cable and the stripping apparatus relative to each other and which has the consequent disadvantage that it cannot be used (or is in any case ineffective) on cables with more than one central conductor (e.g. bipolar cables), according to the present invention the relative axial movement allows the removal of the foil to be carried out in a certain, simple and effective manner even on bipolar or multipolar cables.

According to an aspect, the pressurised air source delivers air at a pressure between 2 bars and 80 bars, with preference for pressures tending to the higher value. According to possible embodiments, the delivered air has pressure between 30 bars and 80 bars, preferably between 40 bars and 80 bars.

According to a further aspect, the cutting means in the closed position form a continuous wall extending around the cutting surface. Advantageously, the air flow delivered by the pressurised air source allows the foil to be pushed, resulting in the opening, on the continuous wall of the cutting means extending around the cutting surface.

According to an aspect, the end portion of the shielding foil is removed by the combined action of the pressurised air jet and the relative motion operated by the axially moving means, between the cutting means and the cable and/or the relative motion operated by the axially moving means, between the positioning means and the cable.

Advantageously, the delivery of pressurised air towards the end portion of the cable and the simultaneous axial translation of the cutting means with respect to the cable axis, cooperate to create an adhesion force between the end portion of shielding foil and the cutting means, so as to optimally push the foil end portion towards the cutting surface of the cutting means, thereby allowing the foil end portion to be homogeneously and optimally removed.

According to an aspect, the apparatus comprises a cable locking device adapted to hold the cable in a fixed position during processing.

In particular, the cable can be effectively retained in a fixed position by the locking device, such as a clamp, during the tensioning of the foil, for example by holding the cable in a fixed position and displacing the positioning means to the closed (i.e. foil retaining) position away from the cable, so as to cause the tensioning of the foil, for example by applying a tensile force on the foil itself.

According to an aspect, the apparatus comprises a suction device for suctioning the end portion from the shielding foil that is torn and removed.

Advantageously, such an air suction device allows for the complete removal of the severed portion of the foil, thus preventing the accumulation of offcuts and scraps which, after processing, could remain attached to the end portion of the cable and/or to components of the apparatus such as the cutting means or the positioning means.

The present invention is also directed to a process according to claim 22, for removing an end portion of the shielding foil of a shielded electric cable by means of an apparatus according to the invention, wherein the end portion of the cable has a shielding foil covering at least one conductor equipped with a covering layer (the foil is thus placed outside the covering layer of the conductor), wherein at least one end portion of the shielding foil is exposed for processing.

The process comprises the following steps:
a) moving the positioning means of the shielding foil into at least one tensioning position, by means of a relative tensioning motion, in an axial direction with respect to the cable, between the positioning means and the cable to cause the tensioning of said end portion of the foil;
b) moving said cutting means towards this shielded electric cable, preferably in a radial direction with respect to the longitudinal axis of the cable, until a closed position of the cutting means around the shielding foil is reached, so that the cutting surface of the cutting means surrounds and/or engages the outer surface of the foil covering the at least one conductor to carry out the cutting of the foil.

Advantageously, according to an aspect, by tensioning the shielding foil, the cutting means are able to carry out optimal cutting of the foil and thus its subsequent effective removal from the cable.

According to an aspect, wherein the apparatus comprises axially moving means adapted to operate, in an axial direction with respect to the cable, a relative motion between the cutting means and the cable, in order to cause the end portion of the shielding foil to be removed, the process comprises the further step c) of operating a relative motion between the cutting means placed in a closed position around the shielding foil and the cable, preferably in an axial direction with respect to the cable, to cause the end portion of the at least one shielding foil to be removed and/or the step of operating a relative motion between the positioning means and the cable, preferably in an axial direction with respect to the cable, to cause the end portion of the at least one shielding foil to be removed. Advantageously, as described above with reference to the apparatus, the foil can be effectively removed (and thus separated from the cable) after cutting while the foil is in a tensioned state, by separate or simultaneous action of the cutting means or displacement means which are moved, with respect to the cable, in order to ensure a complete detachment of the end portion of shielding foil.

According to an aspect, wherein the apparatus comprises at least one pressurised air source adapted to deliver pressurised air towards the end portion, such that the pressurised air exerts a force on the end portion of the at least one shielding foil to push it towards the cutting surface of the cutting means, the process comprises the step (d) of delivering pressurised air by means of the pressurised air source towards the end portion of the cable, such that the pressurised air exerts a force on the end portion of the shielding foil to push it towards the cutting surface of the cutting means thus ensuring adhesion of the shielding foil against the surface of the cutting means.

According to an aspect, pressurised air is delivered along an axial direction defined by the longitudinal axis of said cable, to hit the cable front and generate the opening/detachment of the foil from the insulated conductors.

According to an aspect, at least part of step (c) is carried out during step (d).

Advantageously, the delivery of pressurised air towards the end portion of the cable and the simultaneous axial translation of the cutting means with respect to the cable axis, cooperate to create an adhesion force between the end portion of shielding foil and the cutting means, so as to optimally push the foil end portion towards the cutting surface of the cutting means, thereby allowing the foil end portion to be homogeneously and optimally removed.

According to an aspect, the step (c) provides for moving the cutting means in an axial direction with respect to said cable at least in the direction opposite the delivery direction of pressurised air delivered by said pressurised air source.

Advantageously, this action ensures a complete detachment of the end portion of shielding foil.

According to an aspect, the process comprises, prior to step (a), a step (a') of moving such positioning means towards the shielded electric cable, preferably in a radial direction with respect to the longitudinal axis of the cable, until a closed position of the positioning means around the at least one shielding foil is reached in order to ensure the centering of the at least one conductor covered with the at least one shielding foil.

According to an aspect of the present invention, the positioning means are displaced by the moving means by a travel that is selected so as to bring the foil into a tensioning state. According to a possible embodiment, this tensioning travel is between 0.2 mm and 3 mm.

In other words, the desired tensioning of the shielding foil can be determined by means of a travel, or displacement, for example between 0.2 mm and 3 mm, preferably measured in the axial direction (i.e., according to a direction X' parallel to or coincident with the axis X' of the cable) also appropriately selected according to the thickness of the foil and its own elastic characteristics.

According to an aspect, the step a) provides for moving the positioning means, preferably in an axial direction, with respect to the cable at least towards the free end of the cable.

Advantageously, such movement allows the shielding foil to be effectively and rapidly tensioned.

According to an aspect, the step a) provides for moving the positioning means by a travel that is selected in such a way as to bring the foil into a tensioning state. According to a possible embodiment, this tensioning travel is between 0.2 mm and 3 mm.

In other words, the desired tensioning of the shielding foil can be determined by means of a travel, or displacement, for example between 0.2 mm and 3 mm, preferably measured in the axial direction (i.e., according to a direction X' parallel to or coincident with the axis X of the cable) also appropriately selected according to the thickness of the foil and its own elastic characteristics.

According to an aspect, after the step c), the process comprises the further step of moving the positioning means with respect to said shielded electric cable, preferably in a radial direction with respect to the longitudinal axis of the cable, until an open position of the positioning means is reached, in which the cable is released from the positioning means.

According to an aspect, the process provides a further step of moving the cutting means with respect to the shielded electric cable, preferably in a radial direction with respect to the longitudinal axis of the cable, until an open position of the cutting means is reached, in which the cable is released from the cutting means.

According to an aspect, the process comprises a further step of suctioning the end portion removed from the shielding foil and/or the step of delivering pressurised air in order to remove any residue from the cable or from the apparatus components.

BRIEF DESCRIPTION OF THE FIGURES

Further characteristics and advantages of the present invention will be more evident from the following description, which is made by way of example, with purely indicative and non-limiting reference to the schematic drawings shown in the accompanying figures, in which:

FIGS. 1A and 1B schematically show side views of the ends of a bipolar cable and a coaxial cable, which can be machined with the apparatus and process according to the present invention;

FIG. 1C shows the section, according to a plane perpendicular to the axis, of a bipolar cable according to FIG. 1A;

FIGS. 2A and 2B schematically show a portion of a cable that can be machined in an apparatus according to the invention, comprising a shielding braid;

FIG. 7A schematically shows a perspective view of the apparatus according to the invention during a possible step of the process according to the invention, in which pressurised air is delivered to the end portion of the cable, so that the end portion of the shielding foil is push towards the cutting means;

FIG. 7B schematically shows a perspective view of the apparatus according to the invention during a possible step of the process according to the invention, in which the cutting means placed in a closed position around the shielding foil are moved in an axial direction with respect to the cable, to cause the end portion of the shielding foil to be removed;

EMBODIMENTS OF THE INVENTION

Figure 3:
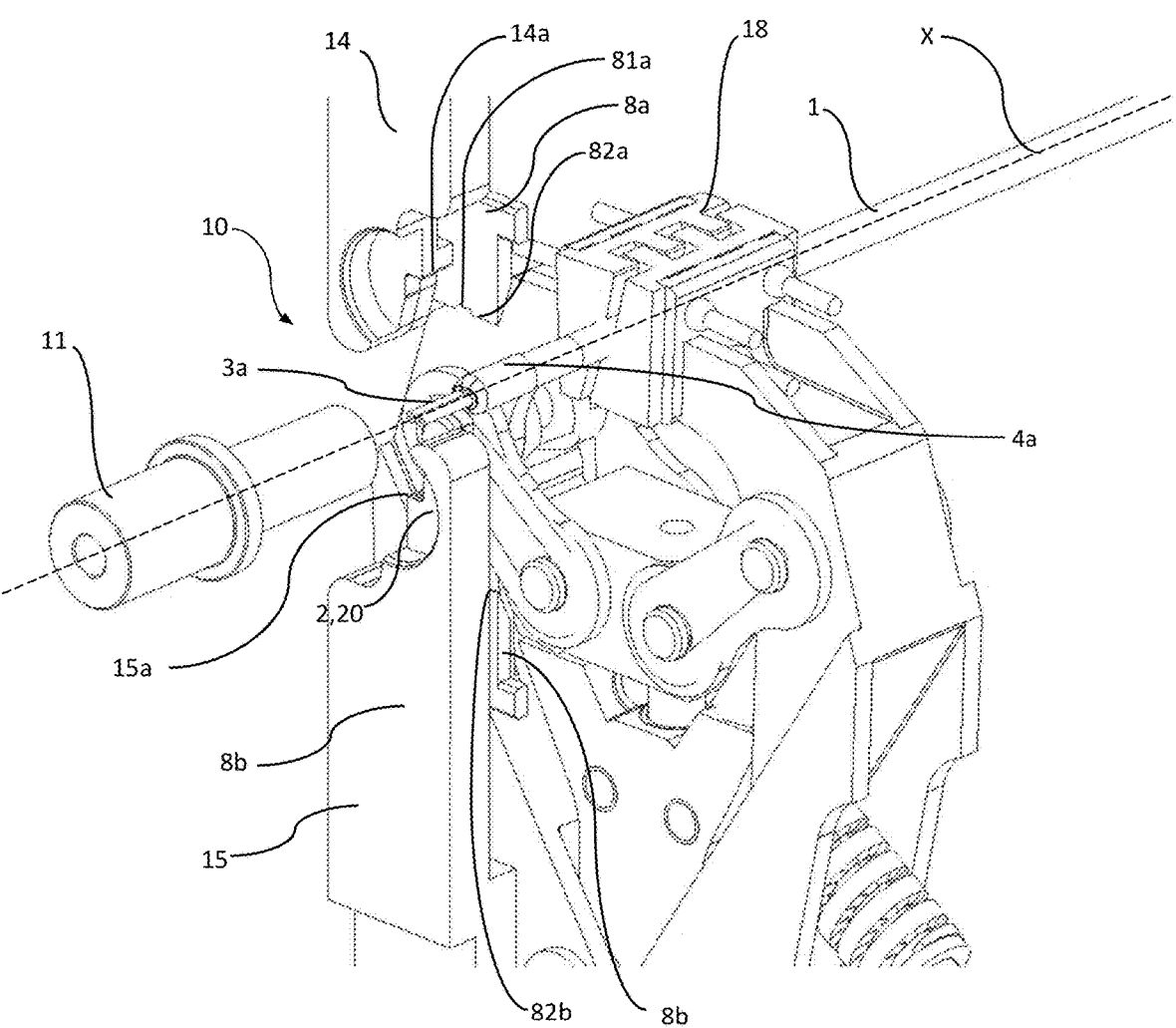
FIG. 3 schematically shows a perspective view of a possible embodiment of the apparatus according to the invention.

Referring to FIGS. 1A and 1B, a shielded electric cable 1 typically comprises at least one central conductor 2, 20 and a shielding braid 4 separated by a layer of electrically insulating material 5, 50, or dielectric, that covers the conductor or conductors 2, 20. As mentioned, an additional shielding layer consisting of a shielding foil 3, preferably a thin multilayer film made, for example, from aluminum, is arranged between the braid 4 and the dielectric 5, 50.

For the sake of simplicity, in this document reference will be made only to the conductor 2, 20 of the cable, this term also referring to the covering layer 5, 50 of electrically insulating material with which it is equipped. In fact, the expression "the foil 3 covers the conductor 2, 20" will be used to mean that the foil is placed externally with respect to the insulating covering layer 5, 50 with which the at least one conductor 2, 20 of the cable 1 is equipped.

Around the shielding braid 4 there is an outer protective sheath 6, also typically made of electrically insulating material.

In a possible embodiment shown in FIG. 1A, the apparatus schematically denoted in the figures as a whole by the numerical reference 10 is adapted to process a cable 1, of the bipolar type, comprising two adjacent conductors 2, 20 each individually wrapped in a respective layer of electrically insulating material (for example a dielectric) 5, 50, and a shielding foil 3 which covers the assembly of the two conductors 2, 20, which are individually wrapped in the respective layer of electrically insulating material 5, 50.

In an embodiment, the apparatus 10 comprises a locking device 18 of said cable 1, adapted to hold the cable 1 in a fixed position during processing. The locking device 18 may comprise a pair of elements that are movable between an operational position of cable locking, in which the cable is retained between the pair of locking elements, and a non-operational position of releasing the cable. For example, such a locking device can be configured as a clamp and different actuating modes for locking/releasing the cable can be employed, such as hydraulic or pneumatic or electric actuators.

With reference to FIGS. 1A and 1B, in a possible embodiment, the end portion 1a of the electric cable 1 is typically prearranged by removing a portion of protective sheathing 6 having given length, so as to expose the shielding braid 4 (if any) of the end portion 1a of the electric cable 1.

In the case where the cable 1 has the shielding braid 4, the cable can be prepared for the subsequent removal of the foil 3 for example by means known in the art, which overturn the shielding braid 4 and are adapted to fold up the end portion of the shielding braid in such a way that the end portion of the underlying foil 3 is exposed.

In a possible embodiment shown in FIGS. 2A and 2B, the exposed part of the shielding braid 4 is preferably locked by locking means 13 adapted to firmly retain a portion of the shielding braid 4, and folded, by overturning means to overturn the shielding braid 4, which are adapted to fold up the end portion 4a of the shielding braid 4 over the locking means 13, so that the end portion 3a of the underlying shielding foil 3 is exposed. The end portion 1a of the shielded electric cable 1, thus prearranged, is then ready to undergo the step of removing the end portion 3a of the shielding foil 3.

In fact, as a result of overturning the braid, at least one end portion 3a of the shielding foil 3 is exposed for processing and not covered by the shielding braid 4.

Figure 8:
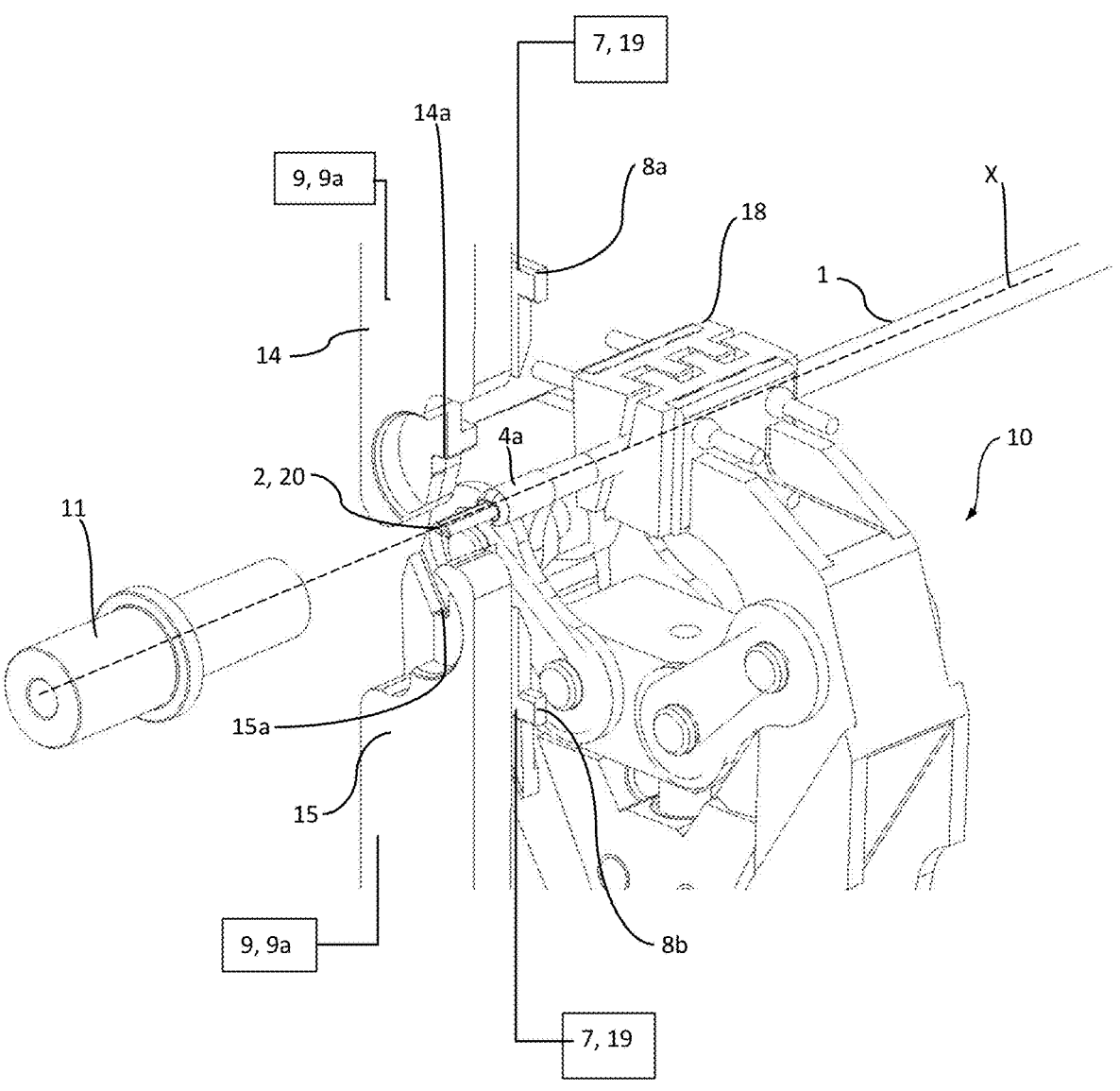
FIG. 8 schematically shows a perspective view of the apparatus according to the invention, in which the moving means of the positioning means and of the cutting means as well as the moving means for the axial relative motion between the cable and the cutting means and the positioning means are also schematically visible.

In a possible embodiment shown for example in FIG. 3, the apparatus 10 comprises positioning means 14, 15 to position the shielding foil 3 of the at least one conductor 2, 20 in tensioned position, and radially moving means 9 and axially moving means 9a (schematically shown in FIG. 8).

The radially moving means 9 are configured to move the positioning means 14, 15 with respect to the cable 1, preferably at least along a radial direction with respect to the longitudinal axis X of the cable 1.

The axially moving means 9a are configured to operate a relative tensioning motion in an axial direction with respect to the cable 1, between said positioning means 14, 15 and the cable 1, to accomplish a tensioning travel to cause the tensioning, or the tensioning and subsequent removal, of the end portion 3a of the shielding foil 3.

The radially and axially moving means 9, 9a schematically shown in FIG. 8 may comprise one or more actuators of known types, for example of pneumatic, electric or hydraulic type.

Figure 4:
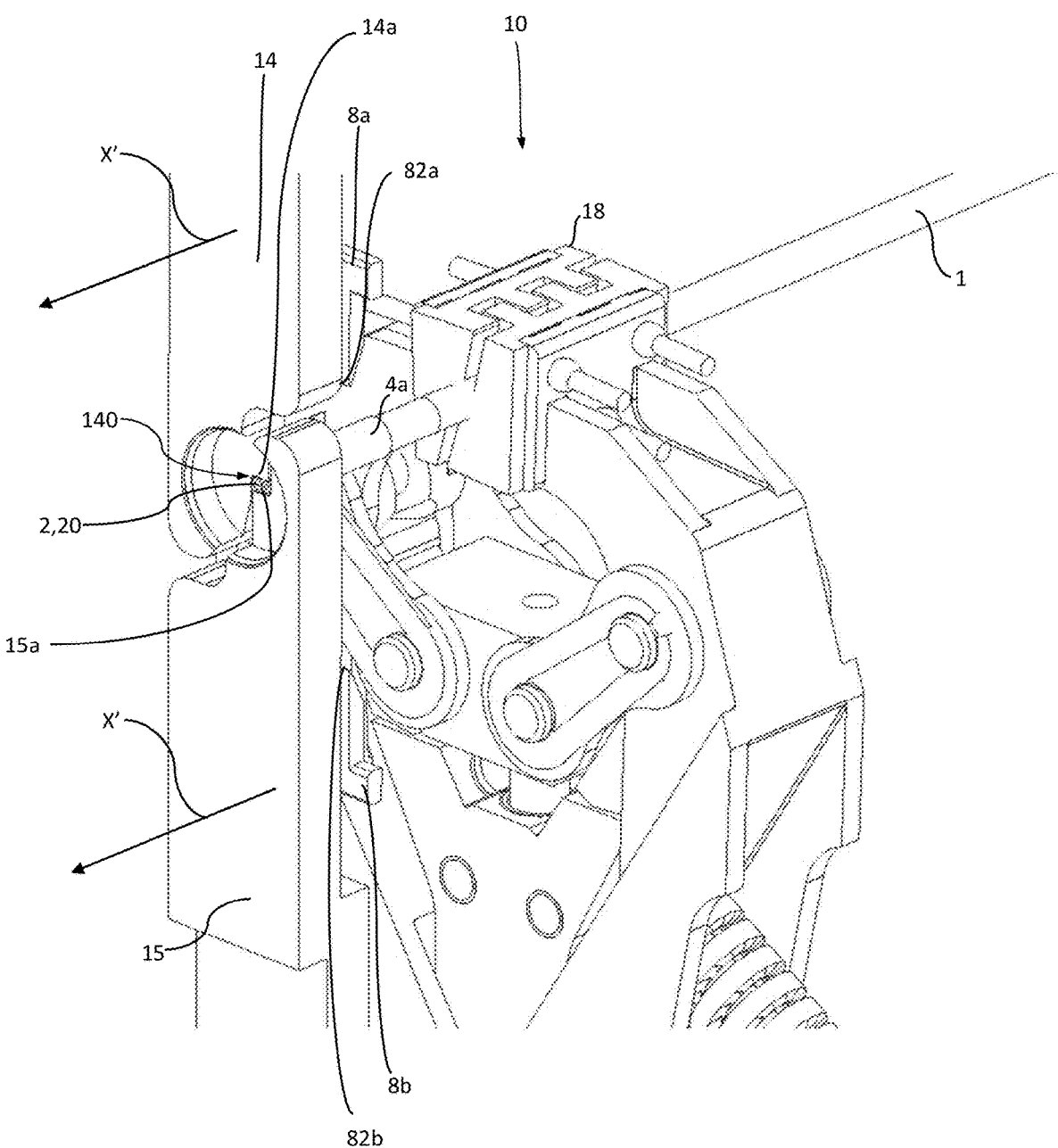
FIG. 4 schematically shows a perspective view of a possible embodiment of the apparatus according to the invention, during a possible step of the process according to the invention in which the positioning means were moved towards the shielded electric cable until a closed position around the shielding foil of the cable was reached, and from this position the positioning means are moved in an axial direction with respect to the cable for tensioning the foil.
Figure 5:
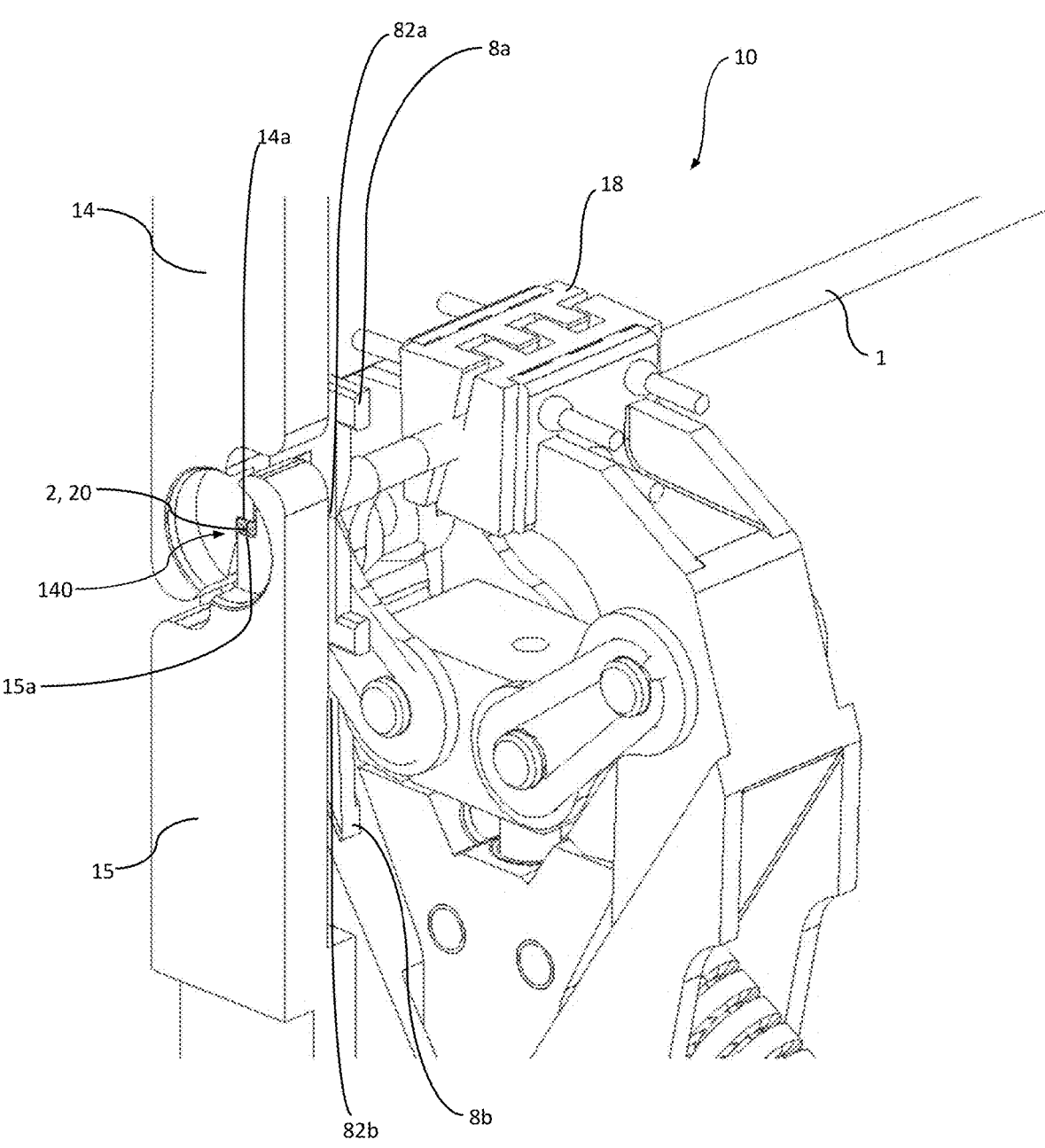
FIG. 5 schematically shows a perspective view of the apparatus according to the invention during a possible step of the process according to the invention, in which the cutting means are in closed position around the shielding foil under tension.
Figure 6:
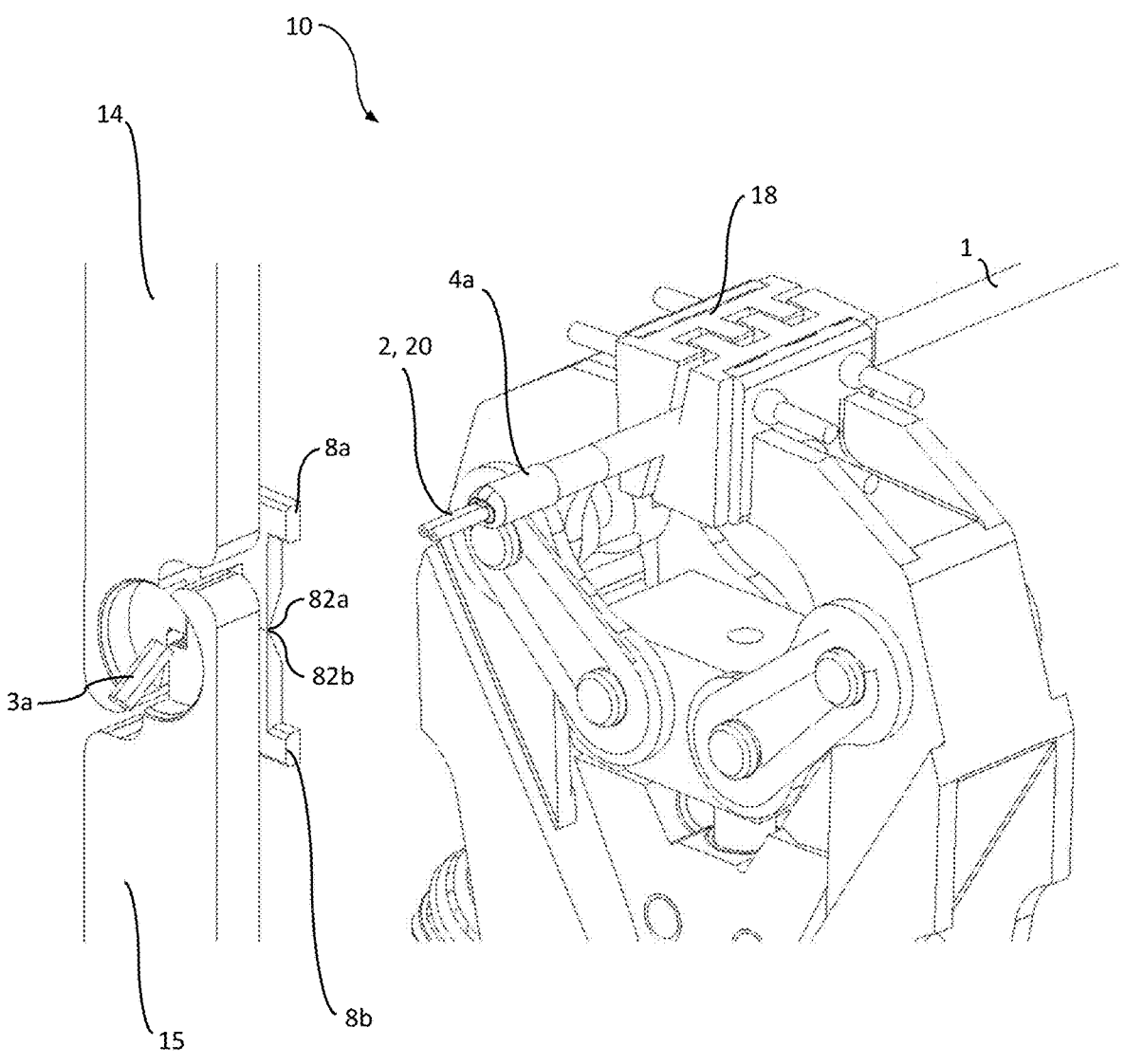
FIG. 6 schematically shows a perspective view of the apparatus according to the invention during a possible step of the process according to the invention, in which the cutting means and the positioning means arranged in a closed position around the shielding foil are moved in an axial direction with respect to the cable, to cause the end portion of the shielding foil to be removed.
Figure 7:
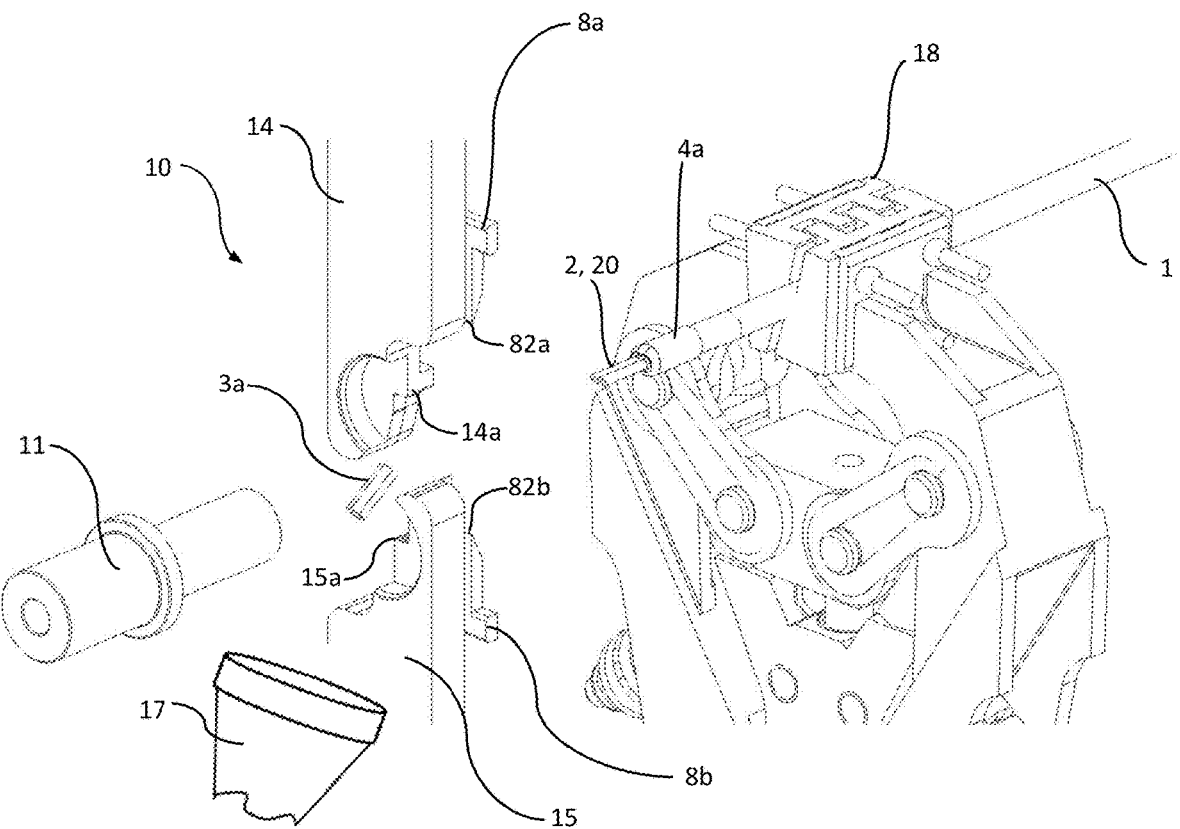
FIG. 7 schematically shows a perspective view of the apparatus according to the invention during a possible step of the process according to the invention, in which the cutting means and the positioning means are moved with respect to the shielded electric cable until an open position is reached in which the cable is released from the cutting means.

In particular, the positioning means 14, 15 are moved by the radially moving means 9, preferably in a radial direction with respect to the cable 1, between a closed position shown in FIGS. 4, 5 and 6 to engage the outer surface of the shielding foil 3 and an open position shown for example in FIGS. 3, 7 and 8, in which the cable 1 is released from the cutting means 14, 15.

In addition, the positioning means 14, 15, after they have been placed in closed position around the shielding foil, are moved by the axially moving means 9a that determine a relative motion, preferably in the axial direction, with respect to the cable 1 (and in particular with respect to the axis X of the cable) to accomplish a tensioning travel, to cause tensioning, or tensioning and subsequent removal of the end portion 3a of the shielding foil 3.

According to a possible embodiment, the tensioning travel of the positioning means 14, 15 in an axial direction (i.e., in the direction X' parallel to or coincident with the axis X of the cable) can be between 0.2 mm and 3 mm. However, other values of the tensioning travel are not excluded and can be appropriately selected in relation to the characteristics of the foil used in the cable being processed, such as the thickness of the foil and its elasticity.

Specifically, according to an embodiment, as can be seen for example from the configuration in FIG. 4, the axial translation movement in the direction parallel to or coincident with the axis X of the cable, the positioning means 14, 15 are in contact with the foil and allow it to be tensioned by applying a tensile force towards the free end of the cable (towards the left if looking at FIG. 4).

For example, the positioning means 14, 15 may comprise two elements that have a main longitudinal extension direction and comprise respective abutment or contacting surfaces 14a, 15a that, in the closed position of the positioning means 14, 15, form a retaining and locking surface 140.

According to an aspect, the end portion 3a of the shielding foil 3 is retained by the abutment or contacting surfaces 14a, 15a of the positioning means 14, 15 at least during the tensioning movement of the end portion 3a of the shielding foil 3 and during the cutting step, i.e., at least when the cutting means are moved closer in the closed position around the shielding foil.

According to a preferred embodiment, the relative tensioning motion of the foil is given by the movement of the positioning means 14, 15 with respect to the cable 1, which remains in a fixed position, however, embodiments providing the axial movement of the cable with respect to the positioning means held in a fixed position are not excluded.

It should be highlighted that during the axial motion and during the subsequent cutting step in which the cutting means 8a, 8b reach the closed position around the foil (see for example FIG. 5), the end portion 3a of the foil 3 is retained by the positioning means 14, 15.

In particular, the end portion of the foil is retained under tension by the positioning means 14, 15.

It should be noted that, according to possible embodiments, the contacting surface 14a, 15a with the end part of the shielding foil of the positioning means 14, 15 is configured to ensure the anchorage and/or an increase in the coefficient of friction as well as an increase in localized pressure.

According to possible embodiments, the contacting surface 14a, 15a of the positioning means 14, 15 comprises a surface discontinuity, e.g. comprises a plurality of recesses and/or protrusions. In addition or as an alternative, a material can be interposed between the contacting surface 14a, 15a and the foil (e.g., an insert permanently or removably constrained to the surface 14a, 15a) that increases the coefficient of friction thereof, or at least part of the contacting surface 14a, 15a can be made with a material having high coefficient of friction.

According to a possible embodiment, as for example shown in the attached figures, the contacting surface 14a, 15a of the positioning means 14, 15 has a surface discontinuity comprising a plurality of adjacent recesses, preferably having longitudinal extent perpendicular to the axis of the cable, thus forming a sawtooth surface pattern, so as to enable the proper retention of the foil particularly during its tensioning, which preferably involves subjecting the foil to a tensile action through the contacting surfaces 14a, 15a of the positioning means.

As mentioned above, the action of the cutting means 8a, 8b on the foil under tension allows a clean and precise cut to be achieved.

In an embodiment, the abutment surfaces 14a, 15a have a non-rectilinear profile comprising a shaping with indentations of curvilinear or rectilinear conformation, or a combination thereof.

When the positioning means 14, 15 are brought to the closed position, the abutment surfaces 14a, 15a, which preferably have complementary shaping, face each other to make the locking surface 140 within which the cable 1 is retained.

According to a possible embodiment for example shown in the attached figures, when the positioning means are moved towards the closed position in a radial direction with respect to the cable 1, the abutment surfaces 14a, 15a can at least partially slide with respect to each other, along a direction substantially parallel to the main longitudinal extension direction of the positioning means 14, 15 and radial with respect to the longitudinal axis X of the cable 1.

As mentioned above, the locking surface 140, made by the facing abutment surfaces 14a, 15a, delimits a section (opening) that is substantially complementary to the section of the end portion 1a of the cable 1 comprising the end portion 3a of the shielding foil 3 that covers the at least one conductor 2, 20.

For example, in the case of a coaxial cable 1, the abutment surfaces 14a, 15a have a curvilinear portion and the locking surface 140 can be formed as a substantially circular surface.

Figure 9A:
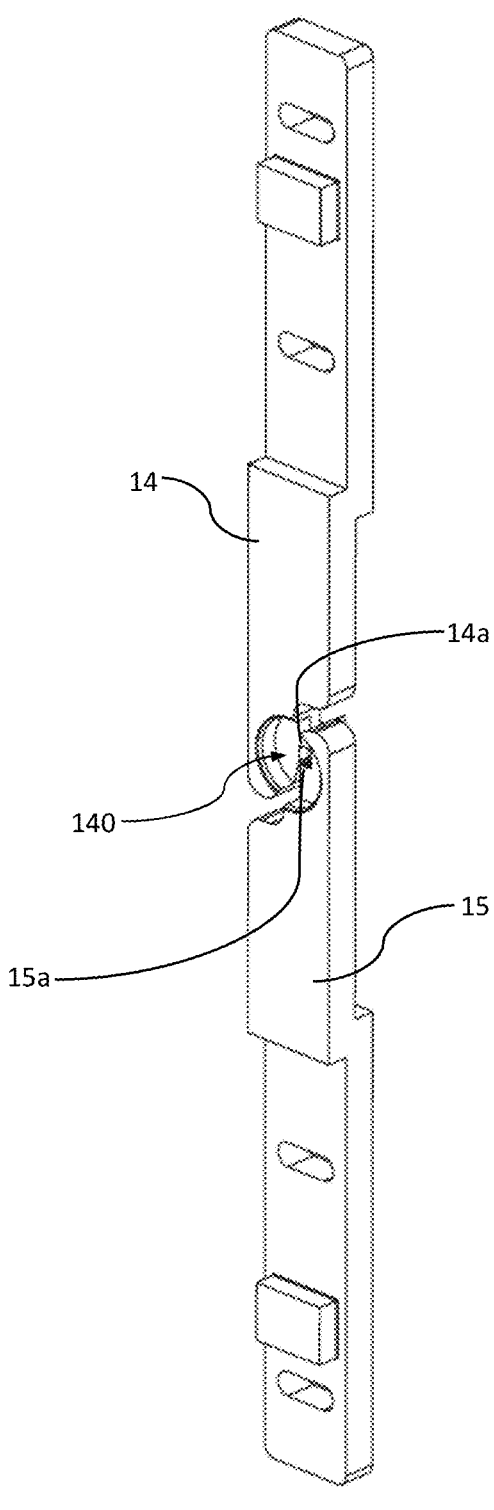
FIGS. 9a and 9b are a perspective view and a detail plan view, respectively, in the main extension plane of the positioning means in closed position.
Figure 9B:
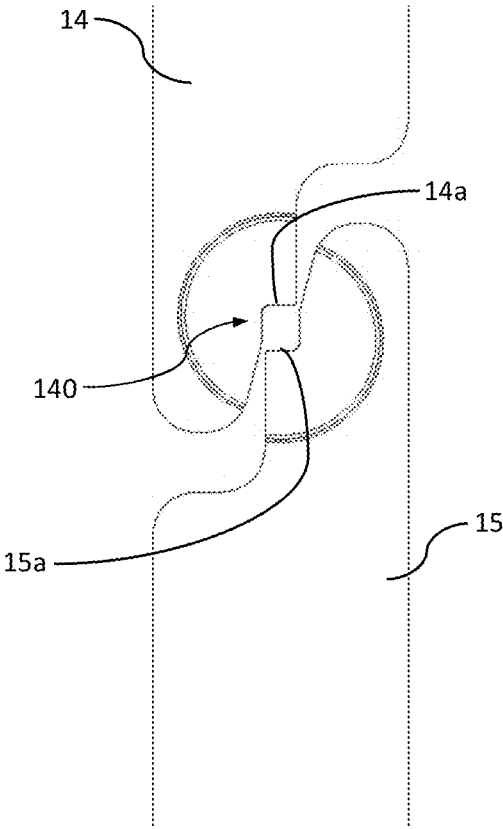

In the embodiment in which the cable 1 to be processed is a cable of the bipolar type comprising two adjacent conductors 2, 20, the abutment surfaces 14a, 15a have at least one curvilinear portion (or a combination of curvilinear portions), and the locking surface 140 formed by the two facing abutment surfaces 14a, 15a is configured substantially complementary to the profile of the outer surface of the shielding foil 3 covering the adjacent conductors 2, 20, and preferably has either a substantially circular profile, preferably the profile of the locking surface is formed by the intersection of two circumferences intersecting each other, or a substantially rectangular profile (as, for example, can be seen in the embodiment of the attached figures and in particular in FIGS. 9A, 9B).

According a possible embodiment, as can be seen for example in FIG. 9A, 9B, in the case where the cable 1 is a cable of the bipolar type, the abutment surfaces 14a, 15a have at least one straight portion (or a combination of straight portions), and the locking surface 140 formed by the two facing abutment surfaces 14a, 15a is configured to be substantially complementary to the profile of the outer surface of the shielding foil 3 covering the adjacent conductors 2, 20 and preferably has a substantially rectangular profile. It should be noted that embodiments in which the abutment surfaces 14a, 15a of the positioning means 14 comprise a combination of straight and curvilinear portions are not excluded.

In the embodiment in which the cable 1 to be processed comprises more than two conductors, the abutment surfaces 14a, 15a have at least one curvilinear portion (or a combination of curvilinear portions), and the locking surface 140 formed by the two facing abutment surfaces 14a, 15a is configured to be substantially complementary to the profile of the outer surface of the shielding foil 3 that covers the conductors.

It should be noted, in general, that the abutment surfaces 14a, 15a of the positioning means are selected and configured such that, once placed in the closed position around the shielding foil, the tensioning movement (i.e., the relative movement of the positioning means with respect to the cable) allows at least one tensioning position of the shielding foil to be reached and in particular allows a tensile action to be provided on the shielding foil so as to cause it to be tensioned.

Figure 10A:
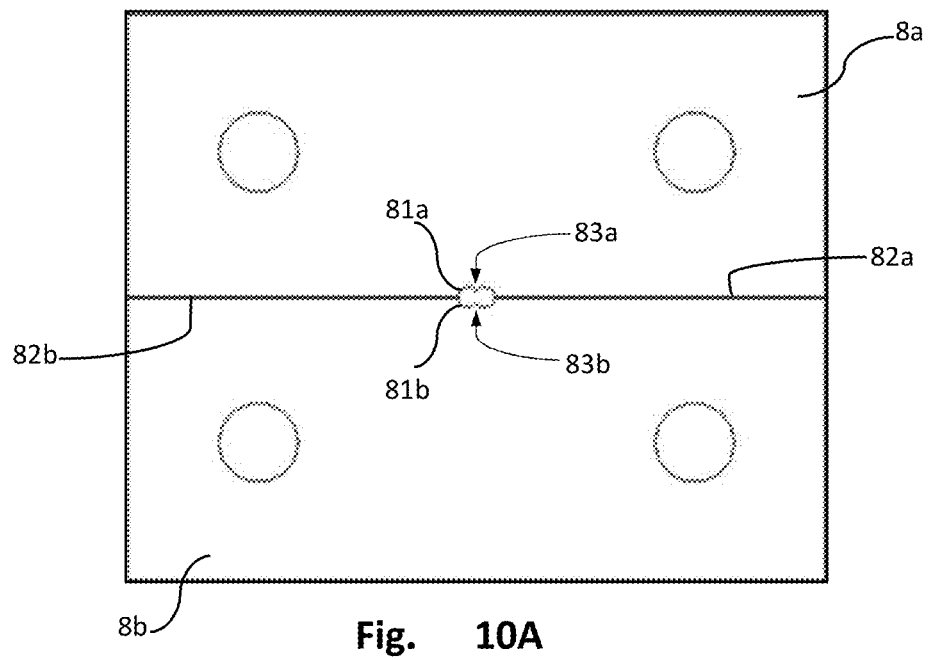
FIGS. 10a and 10b are two plan views in the main front and rear extension plane of the cutting means in closed position.
Figure 10B:
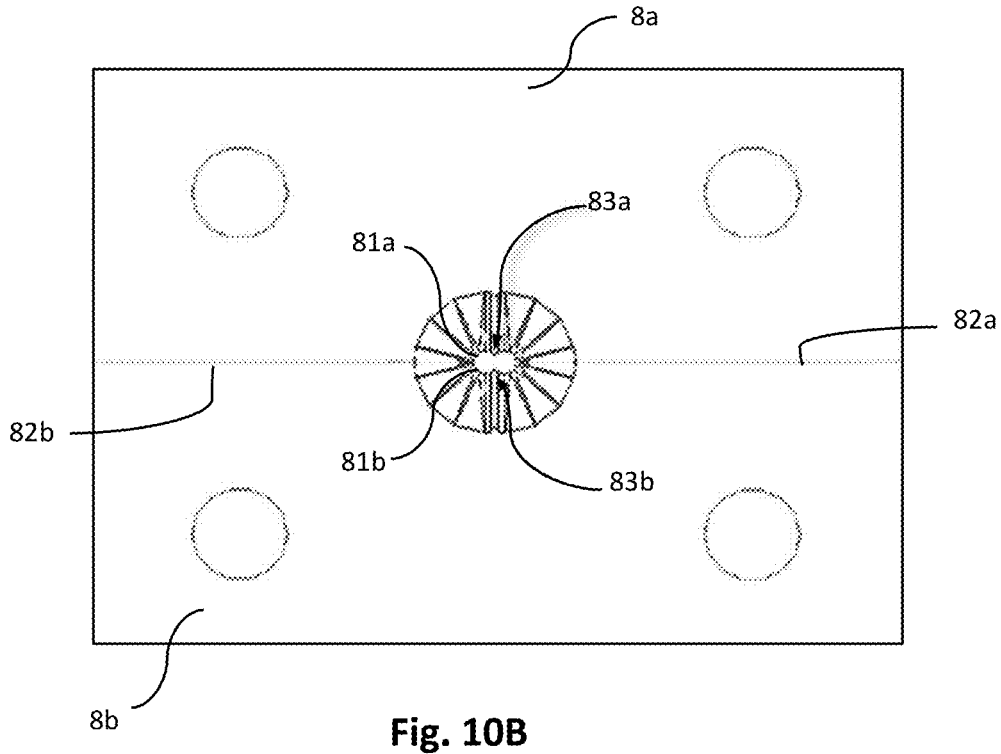

As shown, for example, in FIGS. 3 and 10A, 10B, the apparatus 10 for preparing an end portion 1a of a shielded electric cable 1, in which the end portion 3a of the shielding foil 3a is removed, comprises cutting means 8a, 8b provided with a cutting surface 81a, 81b preferably configured to be substantially complementary to the profile of the outer surface of the shielding foil 3 covering the at least one conductor 2, 20 and/or to be substantially complementary to the profile of the outer surface of the covering layer 5, 50 of the at least one conductor 2, 20.

It should be clarified that, in this document, the "cutting means" terminology denotes an element (or blade) having a cutting edge or cutting surface, see for example in FIGS. 10A and 10B the portions denoted by the numerical references 81a, 81b to indicate the cutting surface or cutting edge.

Radially moving means 19 are also provided, for example schematically shown in FIG. 8, configured to move the cutting means 8a, 8b with respect to the cable 1, preferably at least along a radial direction with respect to the longitudinal axis X of the cable 1 (as, for example, shown in the attached figures).

The radially moving means 19 of the cutting means 8a, 8b, schematically shown in FIG. 8, may comprise one or more actuators of known types, for example of pneumatic, electric or hydraulic type.

In a preferred embodiment, the apparatus 10 further comprises axially moving means 7 adapted to operate a relative motion between the cutting means 8a, 8b and the cable 1, in an axial direction with respect to the cable 1, in order to cause the end portion 3a of the shielding foil 3 to be removed.

It should be noted that the radially moving 9 means and the axially moving 9a means of the positioning means 14, 15 and the radially moving 19 means and the axially moving 7 means and the cutting means 8a, 8b can be independent and separate from each other, or according to the invention they can also correspond. In other words, it is also possible that there are single moving means that determine the movement in radial and axial directions of the cutting means 8a, 8b and the positioning means 14, 15.

In particular, according to a possible embodiment (as shown, for example, in the accompanying figures), the cutting means 8a, 8b are moved by the radially moving means 19, preferably in a radial direction with respect to the cable 1, between a closed position shown in FIGS. 5, 6 in which the cutting surface 81a, 81b engages the outer surface of the shielding foil 3, and an open position shown in FIGS. 3 and 7 in which the cable 1 is released from the cutting means 8a, 8b.

In the closed position, the cutting surface 81a, 81b of the cutting means 8a, 8b has a profile substantially complementary to the profile of the end portion 1a of the cable 1 comprising the end portion 3a of the shielding foil 3 that covers the at least one conductor 2, 20. The section delimited by the profile of the cutting surface 81a, 81b of the cutting means 8a, 8b substantially corresponds to the section of the end portion 1a of the cable 1 (according to a plane perpendicular to the cable axis X) comprising the end portion 3a of this exposed shielding foil 3 covering said at least one conductor. As mentioned above, embodiments are not excluded in which the section delimited by the profile of the cutting surface 81a, 81b of the cutting means 8a, 8b substantially corresponds to the section of the end portion 1a of the cable 1 (according to a plane perpendicular to the cable axis X), externally delimited by the outer surface of the covering layer 5, 50 of the at least one conductor 2, 20 of the cable 1.

For example, in the case of a coaxial cable 1, the cutting surface 81a, 81b comprises at least one curved surface. Embodiments in which the cutting surface comprises at least one straight surface, or a combination of straight and curvilinear surfaces, are not excluded.

According to a possible embodiment in which the cable 1 to be processed is a cable of the bipolar type, comprising two adjacent conductors 2, 20, as for example can be seen in FIGS. 10A, 10B, the cutting surface 81a, 81b of the cutting elements 8a, 8b is configured to be substantially complementary to the profile of the outer surface of the cover 5, 50 of the two adjacent conductors 2, 20, and preferably has a profile formed by the intersection of two circumferences intersecting each other, as for example shown in FIGS. 10A, 10B.

In a possible embodiment, the cutting means 8a, 8b comprise two substantially planar elements (or blades), which have two respective cutting surfaces 81a, 81b made on respective matching surfaces 82a, 82b.

In an embodiment, the matching surfaces 82a, 82b have a straight portion and are adapted to abut against each other in the closed position.

With reference to FIGS. 3, 10A, 10B, the cutting surfaces 81a, 81b have a cutting profile of curvilinear shape, which is formed on these matching surfaces 82a, 82b so that, according to a front view of the cutting elements 8a, 8b (see, for example, FIGS. 10A, 10B), the cutting surfaces 81a, 81b appear as curvilinear indentations made along the straight portion of the matching surfaces 82a, 82b.

In the embodiment shown for example in FIG. 1C in which the cable comprises two adjacent conductors 2, 20, the cutting surfaces 81a, 81b have profile formed by the intersection of two circumferences intersecting each other.

It should be noted that according to a possible embodiment, as can be seen for example in FIGS. 10A, 10B, the cutting surfaces 81a, 81b have at least one protruding element 83a, 83b, or protruding tooth, for example made at the intersection of the two circumferences forming the cutting surface. This protruding element 83a, 83b engages the foil 3, when the cutting means are in the closed position, and is intended to be inserted into the space below the foil 3 between the two adjacent conductors 2, 20.

As shown, for example, in FIGS. 5, 6, 10A, 10B, in the closed position the cutting elements 8a, 8b join each other so that they fit along their respective matching surfaces 82a, 82b, thus forming a continuous wall which extends around the cutting surface 81a, 81b. For example, the continuous wall can be seen in the front view of FIG. 10A in which the front parts of the cutting means 8a, 8b are shown. The rear surface of the cutting means 8a, 8b, that can be seen for example in FIG. 10B, may have a lowered surface in the area surrounding the cutting surface, to possibly accommodate the part of the cable 1 having largest section as it comprise the overturned outer sheath and braid (if any). According to an aspect of the present invention, the end portion 3a of the shielding foil 3 is removed by the cutting means 8a, 8b and/or the positioning means 14, 15, thus by a separate (or simultaneous) action of the cutting means and the positioning means. In more detail, according to an aspect of the present invention, the end portion 3a of the shielding foil 3 is removed by the axially moving means 7 adapted to operate a relative motion between the cutting means 8a, 8b and the cable 1, preferably in an axial direction with respect to the cable, and/or by the moving means 9a adapted to operate a relative motion between the positioning means 14, 15 and said cable 1, preferably in an axial direction with respect to the cable.

In the following, the removal of the foil by moving both the cutting means and the positioning means will be described with reference to the figures, as stated, this embodiment should not be understood as limiting and it is also possible to carry out the removal of the foil by using either the cutting means or the positioning means. What is described below with reference to the positioning means and the cutting means also applies to the embodiment in which foil removal is carried out by using only the positioning means, or only the cutting means, and not their simultaneous action.

The apparatus 10 according to the invention comprises axially moving means 7 adapted to operate a relative motion between the cutting means 8a, 8b and the cable 1, preferably in an axial direction with respect to said cable 1, in order to cause the end portion 3a of the shielding foil 3 to be removed.

The radially moving means 7 to generate the relative motion between the cable 1 and the cutting means 8a, 8b, schematically shown in FIG. 8, may comprise one or more actuators of known types, for example of pneumatic, electric or hydraulic type.

It should be noted that the moving means 7 that determine the relative motion between cable and cutting means may be independent, and therefore separate, from the radially and axially moving means 9, 9a of the positioning means 14 and 15 and from the radially moving means 19 of the cutting means 8a, 8b. However, possible embodiments in which there are single moving means that cause the preferably axial movement of the cutting means and/or the positioning means 14, 15 with respect to the cable, and likewise cause the opening/closing movement of the cutting means 8a, 8b and/or the positioning means 14, 15, are not excluded.

According to a preferred embodiment shown in FIG. 6, the relative motion is given by the movement of the cutting means 8a, 8b with respect to the cable 1, which remains in a fixed position, however, embodiments providing the axial movement of the cable with respect to the cutting means 8a, 8b held in a fixed position are not excluded.

It should be highlighted that, according to a possible embodiment as for example shown in FIG. 6, during the axial motion, the end portion 3a of the foil 3 is retained not only by the positioning means 14, 15 but also by the cutting means 8a, 8b.

In fact, the moving means 9a of the positioning means 14, 15 previously used to operate a relative tensioning motion between the positioning means 14, 15 and the cable 1 are further actuated to operate an additional relative motion with respect to the cable in order to remove the foil.

According to a preferred embodiment shown in FIG. 6, the relative motion is given by the movement of the positioning means 14, 15 with respect to the cable 1, which remains in a fixed position, however, embodiments providing the axial movement of the cable with respect to the positioning means 14, 15 held in a fixed position are not excluded.

In fact, according to a possible embodiment, after the foil has been tensioned and cut, the positioning means 14, 15 remain in closed position around the shielding foil and are further moved by the axially moving means 9a that determine a relative motion, preferably in axial direction, with respect to the cable 1 (and in particular with respect to the cable axis X), to cause the end portion 3a of the shielding foil 3 to be removed.

In fact, according to a possible embodiment, the shielding foil 3 is retained and then dragged by the wall formed by the cutting means 8a, 8b as a result of the movement, and is also retained and dragged by the contacting surface 14a, 15a of the positioning means 14, 15 which remain in the closed position.

The axial translation of the cutting means 8a, 8b and the positioning means 14, 15 with respect to the cable 1 allows the end portion 3a of the foil 3 retained by the cutting means 8a, 8b and the positioning means 14, 15 to be removed.

In addition, if necessary, the radial movement and/or axial movement of the cutting means 8a, 8b and/or the positioning means 14, 15 can be repeated to finalize the removal of the end portion 3a of the foil 3.

It should be noted that the axial movement described is a movement of the cutting means 8a, 8b and/or the positioning means 14, 15 away from the cable, i.e., towards the free end of the cable, but it can also provide at least one axial movement of the cutting means 8a, 8b and/or the positioning means 14, 15 in the opposite direction, that is to say towards the opposite end of the cable with respect the one undergoing the operation.

In a preferred embodiment, the apparatus comprises at least one pressurised air source 11 adapted to deliver pressurised air to the end portion of the foil, such that the pressurised air exerts a force on the end portion 3a of the shielding foil 3 to push it towards the cutting surface 81a, 81b of the cutting means 8a, 8b.

In an embodiment, during the relative motion between the cutting means 8a, 8b and the cable 1, in an axial direction with respect to the cable 1, the end portion 3a is retained by the cutting means 8a, 8b and is pushed against the cutting means 8a, 8b by the pressurised air.

In particular, the pressurised air source 11 preferably comprises a nozzle, for example connected to a pressurised air line, or to a compressor or tank, and is adapted to deliver pressurised air to the end portion 1a of the cable 1, such that the pressurised air exerts a force on the end portion 3a of the at least one shielding foil 3, to push it towards the cutting surface 81a, 81b of the cutting means 8a, 8b and cause it to be retained with respect to the surfaces 8a and 8b. As mentioned, the action of the air may further cause the shielding foil to be partially torn.

As shown in FIGS. 7A and 7B, the pressurised air pushes the end portion 3a of the shielding foil 3 towards the cutting means 8a, 8b in the closed position, so that the end portion 3a is pushed into contact with the cutting surface 81a, 81b.

Pressurised air is preferably delivered as an air jet with a value between 2 bars and 80 bars, preference being given to pressures tending towards the higher value. According to possible embodiments, the delivered air has pressure between 30 bars and 80 bars, preferably between 40 bars and 80 bars.

Specifically, in a preferred embodiment, pressurised air is delivered through the nozzle 11 along an axial direction defined by the longitudinal axis X of the cable 1, to hit the front of the cable 1 and, by creeping between the one or more conductor(s) 2, 20 and the foil 3, pushes the end portion 3a of the foil 3 against the cutting surface of the cutting elements 8a, 8b thereby ensuring its adhesion and, possibly, generating its tearing.

As mentioned above, the direction of the air flow generated by one or more ducts of the nozzle 11 is not limited to the one axial (parallel or corresponding) to the longitudinal X axis of the cable but may also comprise angled directions with respect to the cable axis, preferably in a converging direction with respect to the cable axis.

It should also be noted that, during the axial motion, the end portion 3a of the foil 3 is retained by the cutting means 8a, 8b.

In fact, as a result of the movement, the shielding foil 3 is retained and then dragged by the wall formed by the cutting means 8a, 8b.

In addition, according to a preferred embodiment, not only the pressurised air delivered by the source 11 opens the foil 3 but it also tends to keep the latter pressed against the wall formed by the cutting means 8a, 8b, and ensures the retention of the foil 3 against these cutting means 8a, 8b during the axial translation movement of the cutting means 8a, 8b operated by the axially moving means 7, thereby allowing the definitive separation of the foil 3.

In such an embodiment, the axial translation of the cutting means 8a, 8b with respect to the cable 1 allows the removal of the end portion 3a of the foil 3, which is opened and retained by the cutting means 8a, 8b and/or the air jet.

In addition, if necessary, the radial movement and/or the axial movement of the cutting means 8a, 8b can be repeated to finalize the removal of the end portion 3a of the foil 3.

It should be noted that the axial movement described is a movement of the cutting means 8a, 8b away from the cable, i.e., towards the free end of the cable, but it can also provide at least one axial movement of the cutting means 8a, 8b in the opposite direction, that is to say towards the opposite end of the cable with respect the one undergoing the operation.

Furthermore, according to this embodiment comprising a pressurised air source 11, the end portion 3a of the shielding foil 3 is removed by the combined action of the pressurised air jet and the relative motion operated by the moving means 7 in an axial direction with respect to the cable 1 between the cutting means 8a, 8b and the cable 1, and/or the relative motion operated by the axially moving means 9a in an axial direction with respect to the cable 1 between the positioning means 14, 15 and the cable 1.

In an embodiment shown in FIG. 7, the apparatus 10 comprises a suction device 17 for suctioning the end portion 3*a* which has been torn and removed from the shielding foil 3.

In an embodiment, the apparatus 10 comprises a control logical unit configured to command and control the components of the apparatus, such as the radially moving means 9, 19 to move the positioning means 14, 15 and the cutting means 8*a*, 8*b*, respectively, preferably in the radial direction with respect to the cable 1, particularly between the open position and the closed position, and the axially moving means 7, 9*a* to move the cutting means 8*a*, 8*b* and the positioning means 14, 15, respectively, in a preferably axial direction with respect to the cable 1.

The following will describe in detail the main steps in the operation of the apparatus 10 according to the present invention for preparing an end portion 1*a* of a shielded electric cable 1 by means of an apparatus 10 according to the invention, in which the outer surface of the end portion 1*a* has a shielding foil 3 covering at least one conductor 2, 20 of the cable 1, in which at least one end portion 3*a* of the shielding foil 3 is exposed.

In a possible embodiment, in which the outer surface of the end portion 1*a* of the cable 1 has a shielding braid 4 arranged around the shielding foil 3, the process may comprise a preliminary step shown in FIGS. 2A and 2B and known per se in the art, in which the end portion 4*a* of the shielding braid 4 is folded back on itself by overturning means of the shielding braid 4, so as to expose the end portion 3*a* of the underlying shielding foil 3 for processing.

Specifically, the braid is folded back on itself, that is, its free end is overturned by 180°.

In a known manner, locking means 13 adapted to retain the shielding braid 4 may be applied, and the end portion 4*a* of the shielding braid 4 is folded back on itself by means of the overturning means of the shielding braid 4 over these locking means 13, so as to expose the end portion 3*a* of the underlying shielding foil 3 for processing.

The process according to the invention comprises a step a), schematically shown for example in FIG. 4, of moving the positioning means 14, 15 of the shielding foil to at least one tensioning position by a relative tensioning motion between the positioning means and the cable.

It should be noted that in this step a), the positioning means 14, 15 are moved by means of the axially moving means 9*a* described above, which are adapted to operate a relative tensioning motion in the axial direction with respect to the cable 1, between the positioning means 14, 15 and the cable 1 to accomplish a tensioning travel, in order to cause the tensioning, or the tensioning and subsequent removal, of the end portion 3*a* of the shielding foil 3. According to an embodiment, this step is preceded by the step a') in which the positioning means 14, 15 are moved towards the shielded electric cable 1 in a radial direction with respect to the longitudinal axis X of the cable 1, until a closed position of the positioning means 14, 15 around the at least one shielding foil 3 is reached.

It should be noted that in this step a') the positioning means 14, 15 are moved by the axially moving means 9 described above, which are configured to move the positioning means 14, 15 along a radial direction with respect to the longitudinal axis X of the cable 1, between a closed position to engage the outer surface of the shielding foil 3 of the cable 1 and an open position in which the cable 1 is released from the positioning means 14, 15.

According to a possible embodiment, the step a) of tensioning the foil provides for operating a relative motion between the positioning means 14, 15 placed in the closed position around the shielding foil 3, and the cable 1, in the axial direction with respect to the cable 1, to determine that a foil tensioning position is reached.

Specifically, the step a) provides for moving the positioning means 14, 15 in the axial direction with respect to said cable 1 at least towards the free end of the cable so as to determine the tensioning of the shielding foil, in particular by applying a tensile force on the foil itself by means of the axially positioning means 9*a* which are displaced, preferably axially with respect to the cable.

The movement described is preferably a movement of the positioning means 14, 15 away from the cable, that is, towards the free end of the cable.

The method comprises the further step b), schematically shown for example in FIG. 5, of moving the cutting means 8*a*, 8*b* towards the shielded electric cable 1, preferably in a radial direction with respect to the longitudinal axis X of the cable 1, until reaching the closed position of the cutting means 8*a*, 8*b* around the shielding foil 3 which is tensioned by the positioning means, so that the cutting surface 81*a*, 81*b* surrounds and/or engages the outer surface of the foil 3 covering the at least one conductor 2, 20 to carry out the cutting thereof.

It should be noted that in this step b), the cutting means 8*a*, 8*b* are moved by the above described radially moving means 19 configured to move the cutting means 8*a*, 8*b*, along a radial direction with respect to the longitudinal axis X of the cable 1, with respect to the foil placed in a tensioning position to carry out the cutting of the foil.

In addition, according to an aspect, the method according to the invention comprises a step c) schematically shown in FIG. 6, of operating a relative motion between the cutting means 8*a*, 8*b* and/or the positioning means 14, 15 placed in a closed position around the shielding foil 3, and the cable 1, in a preferably axial direction with respect to the cable 1, to cause the end portion 3*a* of the shielding foil 3 to be removed.

It should be noted that in this step c) the positioning means 14, 15 are moved by the axially moving means 9*a* described above, which are adapted to operate a relative motion in the axial direction with respect to the cable 1, between the positioning means 14, 15 and the cable 1 to cause the removal of the end portion 3*a* of the shielding foil 3, and the movement of the cutting means 8*a*, 8*b* is operated by the axially moving means 7 described above, which are adapted to operate a relative motion between the cutting means 8*a*, 8*b* and said cable 1, in the axial direction with respect to the cable 1, to cause the removal of the end portion 3*a* of the shielding foil 3.

In particular, the step c) provides for moving the cutting means 8*a*, 8*b* and/or the positioning means 14, 15 in an axial direction with respect to said cable 1, at least towards the free end of the cable.

The axial movement described is a movement of the cutting means 8*a*, 8*b* and/or the positioning means 14, 15 away from the cable, i.e., towards the free end of the cable, but it can also provide at least one axial movement of the cutting means 8*a*, 8*b* and/or the positioning means 14, 15 in the opposite direction, that is to say towards the center of the cable 1.

It should be noted that, according to an embodiment, in the step c) the positioning means 14, 15 are also held in the closed position around the cable and thus this step also simultaneously comprises moving the positioning means (at the same time as the cutting means 8a, 8b), preferably in the axial direction, with respect to said cable 1 at least towards the free end of the cable.

The axial movement described is a movement of the cutting means 8a, 8b and/or the positioning means 14, 15 away from the cable, i.e., towards the free end of the cable, but it can also provide at least one axial movement of the cutting means 8a, 8b and/or the positioning means 14, 15 in the opposite direction, that is to say towards the center of the cable 1.

In an embodiment, the process provides the further step, schematically shown in FIG. 7, of moving the cutting means 8a, 8b with respect to the shielded electric cable 1, in a radial direction with respect to the longitudinal axis X of the cable 1, until an open position of the cutting means is reached in which the cable 1 is released from the cutting means 8a, 8b.

In an embodiment, wherein the apparatus 10 comprises at least one pressurised air source 11 adapted to deliver pressurised air towards the end portion 1a such that the pressurised air exerts a force on the end portion 3a of the shielding foil 3 to push it towards the cutting surface 81a, 81b of the cutting means 8a, 8b, the method further comprises the step (d), shown for illustrative purposes in FIGS. 7A and 7B, of delivering pressurised air by means of the pressurised air source 11 towards the end portion 1a of the cable 1, such that the pressurised air exerts a force on the end portion 3a of the shielding foil 3 to push it towards the cutting surface 81a, 81b of the cutting means 8a, 8b and causing it to be partially torn.

Preferably, the pressurised air is delivered through the nozzle 11 along an axial direction (as mentioned, different directions of the air flow are not excluded) defined by the longitudinal axis X of the cable 1, to hit the front of the cable 1 and, by creeping between the one or more conductor(s) 2, 20 and the foil 3, pushes the end portion 3a of the foil 3 against the cutting surface of the cutting elements 8a, 8b thereby generating its retention and, possibly, tearing.

In an embodiment, at least part of the step (c) described above and schematically shown in FIG. 8, during which a relative motion is operated between the cutting means 8a, 8b placed in the closed position around the shielding foil 3, and the cable 1, in the axial direction with respect to the cable 1 in order to cause the removal of the end portion 3a of the shielding foil 3, is carried out during step (d), i.e., the axial movement of the cutting means 8a, 8b to the closed position around the cable 1 occurs at least in a part, and preferably for the entire duration, while pressurised air is delivered from the nozzle 11 towards the front of the cable 1.

In particular, the step (c) provides for moving the cutting means 8a, 8b in an axial direction with respect to the cable 1 at least in the direction opposite the delivery direction of pressurised air delivered by the pressurised air source 11.

The axial movement described is a movement of the cutting means 8a, 8b away from the cable, i.e., towards the free end of the cable, but at least one axial movement of the cutting means 8a, 8b in the opposite direction, that is to say towards the center of the cable 1, may also be provided.

At the end of step c) the process may comprise the further step, schematically shown for example in FIG. 7, of moving the positioning means 14, 15 with respect to the shielded electric cable 1, in a radial direction with respect to the longitudinal axis X of the cable 1, until an open position is reached in which the cable 1 is released from the positioning means 14, 15.

In an embodiment, the process provides the further step, schematically shown in FIG. 7, of moving the cutting means 8a, 8b with respect to the shielded electric cable 1, in a radial direction with respect to the longitudinal axis X of the cable 1, until an open position of the cutting means is reached in which the cable 1 is released from the cutting means 8a, 8b.

Next, the process comprises an additional step, for example shown in FIG. 7, of suctioning the end portion 3a removed from the shielding foil.

The invention claimed is:

1. Apparatus (10) for removing an end portion (3a) of a shielding foil (3) of a shielded electric cable (1), wherein a cable end portion (1a) of said cable (1) has at least one said shielding foil (3) which covers at least one conductor (2, 20) covered by an electrically insulating covering layer (5, 50), wherein at least one said end portion (3a) of said shielding foil (3) is exposed, said apparatus (10) comprising:

positioning means (14, 15) for positioning said shielding foil (3) of said at least one conductor (2, 20) in at least one tensioning position, a locking device adapted to retain the shielded electric cable (1) in fixed position with said end portion (3a) exposed, axially moving means (9a) adapted to operate a relative tensioning motion in an axial direction with respect to said cable (1), between said positioning means (14, 15) and said cable (1), by moving said positioning means (14, 15) to cause tensioning of said end portion (3a) of the shielding foil (3), and cutting means (8a, 8b) provided with a cutting surface (81a, 81b) and first radially moving means (19) configured to move said cutting means (8a, 8b) at least along a radial direction with respect to a longitudinal axis (X) of said cable (1), with respect to said shielding foil placed in said tensioning position to carry out the cutting of the shielding foil (3), wherein said axially moving means (9a) comprise an actuator.

2. Apparatus according to claim 1, further comprising second radially moving means (9) configured to move said positioning means (14, 15) with respect to said cable (1) at least along a radial direction with respect to the longitudinal axis (X) of said cable (1), between a closed position to engage an outer surface of said shielding foil (3) of said cable (1) and an open position in which said cable (1) is released from said positioning means (14, 15).

3. Apparatus according to claim 2, wherein, in said closed position, a contacting surface (14a, 15a) with the end portion (3a) of the shielding foil of the positioning means (14, 15) delimits an opening (140) substantially complementary to the section of the cable end portion (1a) of the cable (1) comprising the end portion (3a) of the shielding foil (3) which covers the at least one conductor (2, 20).

4. Apparatus according to claim 2, wherein said cutting surface (81a, 81b) of said cutting means (8a, 8b) has a profile substantially complementary to the profile of the outer surface of said shielding foil (3) and/or the profile of an outer surface of the electrically insulating covering layer (5, 50) of said at least one conductor (2, 20).

5. Apparatus according to claim 1, wherein said axially moving means (9a) cause a relative motion, in an axial direction with respect to said cable (1), between said positioning means (14, 15) and said cable (1) to cause the tensioning, or the tensioning and subsequent removal, of said end portion (3a) of the shielding foil (3).

6. Apparatus according to claim 1, wherein said positioning means (14, 15) are displaced by said axially moving means (9a) by a tensioning travel, to cause the tensioning of said end portion (3a) of the shielding foil (3).

7. Apparatus according to claim 1, wherein said positioning means (14, 15) are displaced by said axially moving means (9a) by a further travel, greater than said tensioning travel, to cause the removal of said end portion (3a) of the shielding foil (3).

8. Apparatus according to claim 1, wherein a contacting surface (14a, 15a) of the positioning means (14, 15) with the end portion (3a) of the shielding foil is configured to provide anchorage and/or an increase in the coefficient of friction and wherein the contacting surface (14a, 15a) with the end portion (3a) comprises a surface discontinuity and/or a material with a high coefficient of friction.

9. Apparatus (10) according to claim 1, wherein said cutting surface (81a, 81b) of said cutting means (8a, 8b) comprise at least one curved surface.

10. Apparatus (10) according to claim 1, wherein said cutting surface (81a, 81b) of said cutting means (8a, 8b) comprises at least one protruding element or tooth (83a, 83b).

11. Apparatus according to claim 1, wherein said cable (1) comprises at least two said conductors (2, 20), each with a covering layer (5, 50) and said cutting surface (81a, 81b) of said cutting means (8a, 8b) is configured to be substantially complementary to the profile of an outer surface of said shielding foil (3) which covers said two conductors, and/or the profile of an outer surface of the covering layer (5, 50) of said two conductors (2, 20).

12. Apparatus according to claim 11, wherein said cutting surface (81a, 81b) of said cutting means (8a, 8b) has a profile substantially formed by the intersection of two circumferences intersecting each other.

13. Apparatus (10) according to claim 1, wherein said cutting means (8a, 8b) are moved by means of said first radially moving means (19), in a radial direction with respect to said cable (1), between a closed position in which said cutting surface (81a, 81b) engages an outer surface of said shielding foil (3), and an open position in which said cable (1) is released from said cutting means (8a, 8b).

14. Apparatus according to claim 1, further comprising further axially moving means (7) adapted to operate a relative motion between said cutting means (8a, 8b) and said cable (1).

15. Apparatus according to claim 1, wherein at least one of said cutting means (8a, 8b) and said positioning means (14, 15) is adapted to remove said end portion (3a) of said shielding foil (3).

16. Apparatus according to claim 1, wherein said end portion (3a) of the shielding foil (3) is retained by said positioning means (14, 15) at least during the tensioning movement of said end portion (3a) of the shielding foil (3) and during a cutting step of said cutting means (8a, 8b).

17. Apparatus according to claim 1, further comprising at least one pressurized air source (11) adapted to deliver pressurized air to said cable end portion (1a), in such a way that the pressurized air exerts a force on said end portion (3a) of said at least one shielding foil (3) to push it towards said cutting surface (81a, 81b) of said cutting means (8a, 8b).

18. Apparatus according to claim 17, wherein said pressurized air source (11) delivers air at a pressure between 2 bars and 80 bars.

19. Apparatus according to claim 17, wherein during relative motion between said cutting means (8a, 8b) and said cable (1) in an axial direction with respect to said cable (1), said end portion (3a) is retained by said cutting means (8a, 8b) and is pushed against said cutting means (8a, 8b) by the pressurized air.

20. Apparatus according to claim 17, wherein said end portion (3a) of said shielding foil (3) is removed by combined action of said pressurized air source and relative motion operated by further axially moving means (7) in an axial direction with respect to said cable (1) between said cutting means (8a, 8b) and said cable (1), and/or by relative motion operated by said axially moving means (9a) in an axial direction with respect to said cable (1) between said positioning means (14, 15) and said cable (1).

21. Apparatus (10) according to claim 1, wherein said cutting means (8a, 8b) in said closed position form a continuous wall extending around said cutting surface (81a, 81b).

22. The apparatus according to claim 1, wherein said shielding foil (3) is a multilayer film formed of conductive material.

23. The apparatus according to claim 22 wherein said shielded electric cable (1) further comprises a shielding braid (4) surrounding said shielding foil (3) and said locking device retains said shielding braid (4).

24. The apparatus according to claim 1 wherein said actuator is a pneumatic actuator.

25. The apparatus according to claim 1 wherein said actuator is an electric actuator.

26. The apparatus according to claim 1 further comprising a suction device (17) adapted to suction the end portion (3a) removed from the shielding foil (3).

27. The apparatus according to claim 1, wherein said locking device is movable between an operational position of locking said shielded electric cable (1) and a non-operational position, and further comprising an actuator for moving said locking device between said operational position and said non-operational position.

28. The apparatus according to claim 1, wherein an outer surface of said cable end portion (1a) of said cable (1) has a shielding braid (4) arranged around said shielding foil (3), and further comprising overturning means for folding an end portion (4a) of said shielding braid (4) back on itself to expose said end portion (3a) of underlying shielding foil (3).

29. Apparatus according to claim 1, wherein a contacting surface (14a, 15a) of the positioning means (14, 15) comprises a surface discontinuity comprising at least one of a plurality of recesses and a plurality of protrusions having longitudinal extents perpendicular to the axis of the electric cable (1).

30. An apparatus (10) for removing an end portion (3a) of a shielding foil (3) of a shielded electric cable (1), wherein a cable end portion (1a) of said cable (1) has at least one said shielding foil (3) which covers at least one conductor (2, 20) covered by a dielectric layer (5, 50), wherein at least one said end portion (3a) of said shielding foil (3) is exposed, said apparatus (10) comprising:

positioning means (14, 15) for positioning said shielding foil (3) of said at least one conductor (2, 20) in at least one tensioning position, a locking device adapted to retain the shielded electric cable (1) in fixed position with said end portion (3a) exposed, axially moving means (9a) adapted to operate a relative tensioning motion in an axial direction with respect to said cable (1), between said positioning means (14, 15) And said cable (1), by moving said positioning means (14, 15) to cause tensioning of said end portion (3a) of the shielding foil (3), and cutting means (8a, 8b) provided with a cutting surface (81a, 81b) and first radially moving means (19) configured to move said cutting means (8a, 8b) at least along a radial direction with respect to a longitudinal axis (X) of said cable (1), and with respect to said shielding foil placed in said tensioning position, said cutting means adapted to cut the shielding foil (3) to thereby expose said dielectric layer (5, 50), wherein said axially moving means (9*a*) comprise an actuator.

\* \* \* \* \*